United States Patent
Yasukawa et al.

(10) Patent No.: US 12,272,826 B2
(45) Date of Patent: Apr. 8, 2025

(54) POROUS CARBON STRUCTURE, MANUFACTURING METHOD THEREFOR, POSITIVE ELECTRODE MATERIAL USING SAME, AND BATTERY USING SAME

(71) Applicant: National Institute for Materials Science, Tsukuba (JP)

(72) Inventors: Eiki Yasukawa, Tsukuba (JP); Takashi Kameda, Tsukuba (JP); Shoichi Matsuda, Tsukuba (JP); Shoji Yamaguchi, Tsukuba (JP); Shin Kimura, Tsukuba (JP); Kimihiko Ito, Tsukuba (JP); Yoshimi Kubo, Tsukuba (JP)

(73) Assignee: National Institute for Materials Science, Tsukuba (JP)

( * ) Notice: Subject to any disclaimer, the term of this patent is extended or adjusted under 35 U.S.C. 154(b) by 638 days.

(21) Appl. No.: 17/611,984

(22) PCT Filed: May 21, 2020

(86) PCT No.: PCT/JP2020/020143
§ 371 (c)(1),
(2) Date: Nov. 17, 2021

(87) PCT Pub. No.: WO2020/235638
PCT Pub. Date: Nov. 26, 2020

(65) Prior Publication Data
US 2022/0255085 A1      Aug. 11, 2022

(30) Foreign Application Priority Data

May 23, 2019   (JP) .................................. 2019-096585
Mar. 2, 2020   (JP) .................................. 2020-034769

(51) Int. Cl.
*H01M 4/86*      (2006.01)
*H01M 4/88*      (2006.01)
(Continued)

(52) U.S. Cl.
CPC ....... *H01M 4/8605* (2013.01); *H01M 4/8882* (2013.01); *H01M 4/96* (2013.01); *H01M 12/06* (2013.01); *H01M 2004/8689* (2013.01)

(58) Field of Classification Search
CPC .... H01M 4/8605; H01M 4/8882; H01M 4/96; H01M 12/06; H01M 2004/8689
(Continued)

(56) References Cited

U.S. PATENT DOCUMENTS

2005/0281729 A1* 12/2005 Suzuki ................ H01M 4/8885
                                                                423/445 R
2009/0258206 A1* 10/2009 Chida ................ D04H 1/43838
                                                                264/43

(Continued)

FOREIGN PATENT DOCUMENTS

JP    2012-252995 A    12/2012
JP    2015-026482 A     2/2015
(Continued)

OTHER PUBLICATIONS

Extended European Search Report issued in corresponding European Patent Application No. 20809459.9 dated Feb. 19, 2024.
(Continued)

*Primary Examiner* — Ekandra S. Miller-Cruz
*Assistant Examiner* — Kevin Nguyen
(74) *Attorney, Agent, or Firm* — Morgan, Lewis & Bockius LLP

(57) ABSTRACT

The present invention addresses the problem of providing: a porous carbon structure that has a high micropore volume and can be self-contained; a manufacturing method therefor; a positive electrode material using the same; and a battery (particularly an air battery) using the same. The present invention is a porous carbon structure that is for a positive electrode for an air battery and has voids and a skeleton formed by incorporating carbon, the porous carbon structure satisfying all of the following conditions (a) to (d). (a) The t-plot external specific surface area is within the range of 300 $m^2/g$ to 1600 $m^2/g$; (b) the total volume of micropores having a diameter of 1 nm to 200 nm is within the range of (Continued)

1.2 cm³/g to 7.0 cm³/g; (c) the total volume of micropores having a diameter of 1 nm to 1000 nm is within the range of 2.3 cm3/g to 10.0 cm³/g; and (d) the overall porosity is within the range of 80% to 99%.

17 Claims, 8 Drawing Sheets

(51) Int. Cl.
*H01M 4/96* (2006.01)
*H01M 12/06* (2006.01)

(58) Field of Classification Search
USPC .................................................... 429/231.8
See application file for complete search history.

(56) References Cited

U.S. PATENT DOCUMENTS

| | | | |
|---|---|---|---|
| 2011/0136036 A1* | 6/2011 | Miyata | H01M 4/9083 429/479 |
| 2015/0024247 A1* | 1/2015 | Lockett | H01M 10/26 29/623.5 |
| 2016/0190547 A1 | 6/2016 | Schweiss | |
| 2017/0194650 A1 | 7/2017 | Mihara et al. | |
| 2017/0221646 A1* | 8/2017 | Lee | C04B 38/0022 |
| 2017/0352890 A1 | 12/2017 | Tadokoro et al. | |

FOREIGN PATENT DOCUMENTS

| | | |
|---|---|---|
| JP | WO2016/009935 A1 | 1/2016 |
| JP | 5852548 B2 | 2/2016 |
| JP | WO2016/104625 A1 | 6/2016 |
| JP | 2016-532274 A | 10/2016 |
| JP | 2016178005 A * | 10/2016 |
| JP | 2017130446 A * | 7/2017 |
| JP | 2018-133168 A | 8/2018 |

OTHER PUBLICATIONS

Hisashi, "Current State of Electroconductive Carbonblack," Journal of Printing Science and Technology, 44 (3): 9-19 (2007).
Maeno, "The structure and characteristics of conductive carbon black ketjenblack EC," Tanso, 222: 140-146 (2006).
International Search Report issued in corresponding International Patent Application No. PCT/JP2020/020143 dated Jul. 28, 2020.
International Preliminary Report on Patentability issued in corresponding International Patent Application No. PCT/JP2020/020143 dated Mar. 17, 2021.

* cited by examiner

POROUS CARBON STRUCTURE, MANUFACTURING METHOD THEREFOR, POSITIVE ELECTRODE MATERIAL USING SAME, AND BATTERY USING SAME

TECHNICAL FIELD

The present invention relates to a porous carbon structure, a method for manufacturing the same, a positive electrode material using the same, and a battery using the same.

The present invention relates to a porous carbon structure that has, in particular, all of self-supporting ability, high ion transport efficiency, high air permeability, and a wide reaction area, and that is suitable for a material for a positive electrode (in the present application, the material may also be referred to as "positive electrode material" or "positive electrode structure") of a metal air battery, and a battery using the porous carbon structure.

BACKGROUND ART

Batteries have attracted attention as a driving force behind a smart society, and demand for the batteries has been rapidly increasing. There are various types of batteries, and among them, air batteries have received high attention because of their small size, light weight, and structure suitable for increasing the capacity.

The air battery is a battery in which oxygen in the air is used as a positive electrode active material, and a metal is used as a negative electrode active material. The air battery is also called a metal-air battery, and is regarded as a kind of fuel cell.

The air battery is disclosed in, for example, Patent Literatures 1 and 2, and representative examples of the air battery include a lithium-air battery in which a metal or compound capable of occluding and releasing lithium ions is used as a negative electrode active material.

In the air battery, the positive electrode active material is oxygen in the air, and the positive electrode active material can be supplied from the outside of the battery. Therefore, the air battery can be reduced in size and weight, and further has a structure suitable for increasing the capacity.

However, at present, potential of the air battery on the size and weight reduction and increase in capacity has not been sufficiently extracted.

One of the causes lies in the positive electrode structure.

As described above, in the air battery, since oxygen in the air serves as the positive electrode active material, the positive electrode structure is required to have a structure capable of taking in a large amount of oxygen from the air. In other words, the positive electrode structure is required to have high air or oxygen permeability.

In addition, the positive electrode structure is required to have both high ion transport efficiency and a wide reaction field, which are characteristics generally required of the batteries.

Furthermore, in order to reduce the size and weight as well as cost of the air battery, it is desired that the positive electrode structure be self-supportable.

In this context, from the viewpoint of ease of handling, cost, weight, green environment, and recycling, carbon is preferred as a material of the positive electrode structure. A positive electrode structure that is made porous for achieving high air or oxygen permeability, that is, a porous carbon structure is often used.

Among porous carbon materials, Ketjen Black (registered trademark) is known as a material having a large total specific surface area (BET specific surface area) as well as a material having a large pore volume and specific surface area of so-called mesopores of a pore diameter of 2 nm or more and 50 nm or less and macropores having a pore diameter of 50 nm or more. Ketjen Black is used as a raw material of a porous carbon structure used in a positive electrode of an air battery. However, Ketjen Black (registered trademark) is powdery and is not self-supportable. For this reason, in order to use Ketjen Black (registered trademark) as a positive electrode structure, it is necessary to employ a method in which a composition containing a binder and the like is dispersed in a solvent, and the composition is applied to metal foil or the like by means of a doctor blade method or the like, or supported on a metal mesh or the like. Therefore, there are problems that the positive electrode structure has a complicated structure to have an increased weight, the cost increases, or the air or oxygen flow is inhibited.

In conventional air batteries, since the positive electrode still has insufficient characteristics, there is a problem that their original battery characteristics cannot be sufficiently exhibited.

In view of such a problem, Patent Literature 1 proposes use of porous carbon as a raw material of a positive electrode layer, wherein the porous carbon includes pores including mesopores and micropores having a pore diameter smaller than that of the mesopores, carbonaceous walls that constitute an outer contour of the mesopores form a three-dimensional network structure, the micropores are formed in the carbonaceous walls, the mesopores are open pores, pore portions continuously form connecting pores, a half width of a pore size distribution of the pores is 2 nm or less, a half width of a connecting pore size distribution of the connecting pores is 50 nm or more, and a pore volume of pores having a pore diameter of 1 nm or more is 1.0 ml/g or more and 4.0 ml/g or less. In the specification of Patent Literature 1, it is described that in the formation of the positive electrode layer, a method in which a composition containing porous carbon, a binder, and the like is dispersed in a solvent and the composition is applied by means of a doctor blade method or the like, or a method in which the composition is made by pressure molding can be used.

Patent Literature 2 proposes a lithium-air battery using a positive electrode layer in which a first pore volume of pores having a pore diameter of 1 nm or more and 200 nm or less is larger than a second pore volume of pores having a pore diameter of more than 200 nm and 1000 nm or less. In the specification of Patent Literature 2, it is described that as a method for forming the positive electrode layer, for example, a method of applying a coating material obtained by dispersing a composition containing a conductive porous material, a binder, and the like in a solvent to a positive electrode current collector by means of a doctor blade method or the like, or a method of molding the above composition made by pressure molding.

Ketjen Black (registered trademark) is disclosed in, for example, Non-Patent Literatures 1 and 2.

CITATION LIST

Patent Literature

PATENT LITERATURE 1: JP 5852548 B
PATENT LITERATURE 2: JP 2018-133168 A

Non-Patent Literature

NON-PATENT LITERATURE 1: Journal of Printing Science and Technology, Vol. 44, No. 3, pp. 9-19 (2007)

NON-PATENT LITERATURE 2: Tanso, Vol. 222, pp. 140-146 (2006)

SUMMARY OF INVENTION

Technical Problem

An object of the present invention is to provide a battery which is small in size and light in weight as well as which is suitable for increasing the capacity, particularly an air battery which is small in size and light in weight as well as which is suitable for increasing the capacity. For this purpose, an object of the present invention is to provide a porous carbon structure that has all of high air or oxygen permeability, high ion transport efficiency, and a wide reaction field, the porous carbon structure being suitable as a positive electrode structure of an air battery, particularly a self-supportable porous carbon structure.

Meanwhile, when the porous carbon described in Patent Literature 1 in which the pore volume of pores having a pore diameter of 1 nm or more is 1.0 ml/g or more and 4.0 ml/g or less is used as a raw material of the positive electrode layer, the pore volume in the positive electrode layer does not become larger than the pore volume in the porous carbon of the raw material. In this case, since the binder is used to form the positive electrode layer, some of the pores of the porous carbon are directly filled with the binder, and thus the pore volume in the positive electrode layer may become smaller than the pore volume in the porous carbon of the raw material. Therefore, it cannot be said that required sufficient battery performance is exhibited. Thus, a positive electrode layer inheriting the pore volume in porous carbon of a raw material is desired, and a positive electrode layer having a large pore volume exceeding the pore volume in porous carbon as a raw material is further desired.

Also, in the lithium-air battery described in Patent Literature 2 which uses a positive electrode layer in which the first pore volume of pores having a pore diameter of 1 nm or more and 200 nm or less is larger than the second pore volume of pores having a pore diameter of more than 200 nm and 10,000 nm or less, the binder is used to form the positive electrode layer. Therefore, as in the case of Patent Literature 1, some of the pores of the porous carbon as a raw material are directly filled with the binder, and the pore volume in the positive electrode layer may become smaller than the pore volume in the porous carbon of the raw material, and the absolute amount of the pore volume in the positive electrode layer is not large. Therefore, it cannot be said that required sufficient battery performance is exhibited. Thus, as in the case of Patent Literature 1, a positive electrode layer inheriting the pore volume in porous carbon of a raw material is desired, and a positive electrode layer having a large pore volume exceeding the pore volume in porous carbon as a raw material is further desired. In porous carbon materials, it is common that the first pore volume of pores having a pore diameter of 1 nm or more and 200 nm or less is larger than the second pore volume of pores having a pore diameter of more than 200 nm and 10,000 nm or less.

In view of the above-mentioned circumstances, an object of the present invention is to provide a porous carbon structure that has a high pore volume and is self-supportable, a method for manufacturing the same, a positive electrode material using the same, and a battery (particularly an air battery) using the same.

Solution to Problem

In order to solve the above-mentioned problems, the present invention specifically has the following configuration.

[1] A porous carbon structure for an air battery positive electrode, the porous carbon structure comprising pores and a skeleton containing carbon, and satisfying all of conditions (a) to (d) shown as follows:
  (a) a t-plot external specific surface area is in a range of 300 $m^2$/g or more and 1,600 $m^2$/g or less;
  (b) a pore volume of the pores having a diameter of 1 nm or more and 200 nm or less is in a range of 1.2 $cm^3$/g or more and 7.0 $cm^3$/g or less;
  (c) a pore volume of the pores having a diameter of 1 nm or more and 1,000 nm or less is in a range of 2.3 $cm^3$/g or more and 10.0 $cm^3$/g or less; and
  (d) an overall porosity is in a range of 80% or more and 99% or less.

[2] The porous carbon structure according to [1], further satisfying condition (e) shown as follows:
  (e) a pore volume of the pores having a diameter of 200 nm or more and 10,000 nm or less is in a range of 2.3 $cm^3$/g or more and 8.0 $cm^3$/g or less.

[3] The porous carbon structure according to [1] or [2], wherein the pore volume of the pores having a diameter of 1 nm or more and 200 nm or less in (b) is in a range of 2.2 $cm^3$/g or more and 7.0 $cm^3$/g or less.

[4] The porous carbon structure according to any one of [1] to [3], wherein the pore volume of the pores having a diameter of 1 nm or more and 200 nm or less in (b) is in a range of more than 2.4 $cm^3$/g and 6.0 $cm^3$/g or less.

[5] The porous carbon structure according to any one of [1] to [4], wherein the pore volume of the pores having a diameter of 1 nm or more and 1,000 nm or less in (c) is in a range of 4.0 $cm^3$/g or more and 10.0 $cm^3$/g or less.

[6] The porous carbon structure according to [5], wherein the pore volume of the pores having a diameter of 1 nm or more and 1,000 nm or less in (c) is in a range of 4.1 $cm^3$/g or more and 9.0 $cm^3$/g or less.

[7] The porous carbon structure according to any one of [1] to [6], the porous carbon structure having an apparent density in a range of 0.05 $g/cm^3$ or more and 0.20 $g/cm^3$ or less.

[8] The porous carbon structure according to any one of [1] to [7], wherein the overall porosity in (d) is in a range of 90% or more and 99% or less.

[9] The porous carbon structure according to any one of [1] to [8], wherein the skeleton is made of carbon.

[10] The porous carbon structure according to any one of [1] to [9], wherein the t-plot external specific surface area in (a) is in a range of 900 $m^2$/g or more and 1,600 $m^2$/g or less.

[11] The porous carbon structure according to any one of [1] to [10], the porous carbon structure having a fluorine content of 0.0002 mass % or less.

[12] The porous carbon structure according to any one of [1] to [11], the porous carbon structure having self-supporting ability.

[13] A method for manufacturing the porous carbon structure according to any one of [1] to [12], the method comprising the steps of:
  preparing a mixture slurry containing porous carbon particles and a binding polymer material;
  molding the mixture slurry;
  immersing a sample obtained by the molding step in a solvent in which the binding polymer material has low solubility;
  drying the sample obtained by the immersing step; and subjecting the sample obtained by the drying step to a carbonization treatment.

[14] The method according to [13], wherein the carbonization treatment is performed in an atmosphere of an oxidizing gas or an inert gas.

[15] The method according to [14], wherein when the carbonization treatment is performed in the atmosphere of the oxidizing gas, the oxidizing gas has an oxygen concentration in a range of more than 0.03% and less than 5%.

[16] The method according to any one of [13] to [15], wherein the carbonization treatment is performed at a treatment temperature in a range of 350° C. or more and 3000° C. or less.

[17] The method according to any one of [13] to [16], wherein the carbonization treatment is performed until a pore volume of the pores having a diameter of 1 nm or more and 1,000 nm or less in a product obtained by the carbonization treatment reaches 1.02 times or more a pore volume in the porous carbon.

[18] The method according to any one of [13] to [17], wherein the mixture slurry further contains carbon fibers.

[19] The method according to any one of [13] to [18], further comprising subjecting the sample obtained by the drying step to an infusibilizing treatment subsequent to the drying step and prior to the carbonization treatment.

[20] The method according to any one of [14] to [19], further comprising, when the carbonization treatment is performed in the atmosphere of the oxidizing gas, subjecting the sample obtained by the carbonization treatment to an additional carbonization treatment under an inert gas atmosphere subsequent to the carbonization treatment.

[21] A positive electrode material for an air battery, the positive electrode material comprising the porous carbon structure according to any one of [1] to [12].

[22] An air battery comprising a positive electrode structure, a negative electrode structure, a separator, and an electrolyte member, wherein the positive electrode structure comprises the porous carbon structure according to any one of [1] to [12].

[23] The air battery according to [22], wherein the porous carbon structure has a flow path through which air or oxygen passes.

[24] The air battery according to [22] or [23], wherein the positive electrode structure comprises a metal-containing positive electrode substrate having a flow path through which air or oxygen passes, and wherein the metal-containing positive electrode substrate is in electrical contact with the porous carbon structure.

[25] A porous carbon structure for an air battery positive electrode, the porous carbon structure comprising pores and a skeleton containing carbon, having self-supporting ability, and satisfying at least one of conditions (a) to (e) shown as follows:
(a) a t-plot external specific surface area is in a range of 300 m$^2$/g or more and 1,600 m$^2$/g or less;
(b) a pore volume of the pores having a diameter of 1 nm or more and 200 nm or less is in a range of 1.2 cm$^3$/g or more and 7.0 cm$^3$/g or less;
(c) a pore volume of the pores having a diameter of 1 nm or more and 1,000 nm or less is in a range of 2.3 cm$^3$/g or more and 10.0 cm$^3$/g or less;
(d) an overall porosity is in a range of 80% or more and 99% or less; and
(e) a pore volume of the pores having a diameter of 200 nm or more and 10,000 nm or less is in a range of 2.3 cm$^3$/g or more and 8.0 cm$^3$/g or less.

Advantageous Effects of Invention

According to the present invention, it becomes possible to provide a battery which is small in size and light in weight as well as which is suitable for increasing the discharge capacity, particularly an air battery which is small in size and light in weight as well as which is suitable for increasing the capacity.

The air battery which is small in size and light in weight as well as which is suitable for increasing the capacity is provided by the porous carbon structure of the present invention, which has all of high air or oxygen permeability, high ion transport efficiency, and a wide reaction field as well as which is self-supportable.

The porous carbon structure of the present invention has a large number of pores and a skeleton containing carbon, and can satisfy all of the above-mentioned conditions (a) to (d). Such a porous carbon structure has an unprecedented high pore volume and is self-supportable. Such a porous carbon structure may be used as a positive electrode material for an air battery. Since such a porous carbon structure itself is self-supportable, when the porous carbon structure is used in a positive electrode structure, a current collector such as a metal mesh is unnecessary, and the air battery can be reduced in size and weight. Furthermore, since the porous carbon structure has an unprecedented high pore volume, the porous carbon structure has high air or oxygen permeability, high ion transport efficiency, and a large reaction field, so that an air battery having high-capacity and high-load characteristics can be provided.

The method for manufacturing the porous carbon structure of the present invention includes the steps of: preparing a mixture slurry containing porous carbon particles and a binding polymer material, molding the mixture slurry, immersing a sample obtained by the molding step in a solvent in which the binding polymer material has low solubility, drying the sample obtained by the immersing step, and subjecting the sample obtained by the drying step to a carbonization treatment. Therefore, the method can provide the above-mentioned porous carbon structure having a high pore volume and being self-supportable. The carbonization treatment can burn off and eliminate the binding polymer material and further burn off and eliminate a part of the porous carbon particles, so that the binding between the porous carbon particles can be formed. The carbonization treatment can be performed in an atmosphere of an oxidizing gas or an inert gas. When the carbonization treatment is performed in an oxidizing gas atmosphere and the oxidizing gas has an oxygen concentration in the range of more than 0.03% and less than 5%, the above-mentioned porous carbon structure having a high pore volume and being self-supportable can be provided.

DESCRIPTION OF EMBODIMENTS

Hereinafter, embodiments of the present invention will be described with reference to the drawings. Similar elements are denoted by similar reference signs, and the description thereof will be omitted. The present invention is not limited to these embodiments.

In the present invention, the porous carbon structure that has self-supporting ability or that is self-supportable refers to a film-like structure capable of maintaining the shape as a film that is self-supporting without using a support (in the present application, the structure may also be referred to as "self-supporting film"). The porous carbon structure is formed from a skeleton mainly containing carbon, and is used in a thickness within the range of 20 µm to 800 µm, preferably within the range of 50 µm to 500 µm.

Specifically, the porous carbon structure (that is, the self-supporting film) in the meaning of the present invention means that in a positive electrode layer, a support, for example, a metal mesh made of a simple metal such as copper (Cu), tungsten (W), aluminum (Al), nickel (Ni), titanium (Ti), gold (Au), silver (Ag), platinum (Pt), palladium (Pd), or stainless steel (SUS), or an alloy containing a metal-containing component, and a nonwoven or woven fabric consisting of components such as carbon fibers and polyester fibers is not included, or means that the positive electrode layer is not formed on a metal foil substrate, such as aluminum foil, nickel foil, or SUS foil. Also, the porous carbon structure does not contain an organic binder that is intended for adhesion to a support or a substrate, particularly a fluorine-containing binder. In the porous carbon structure, a fluorine content is 0.0002 mass % or less. The porous carbon structure may be a self-supporting body having practical rigidity and mechanical strength as well as flexibility.

First Embodiment

In the first embodiment, a porous carbon structure of the present invention will be described.

Figure 1:
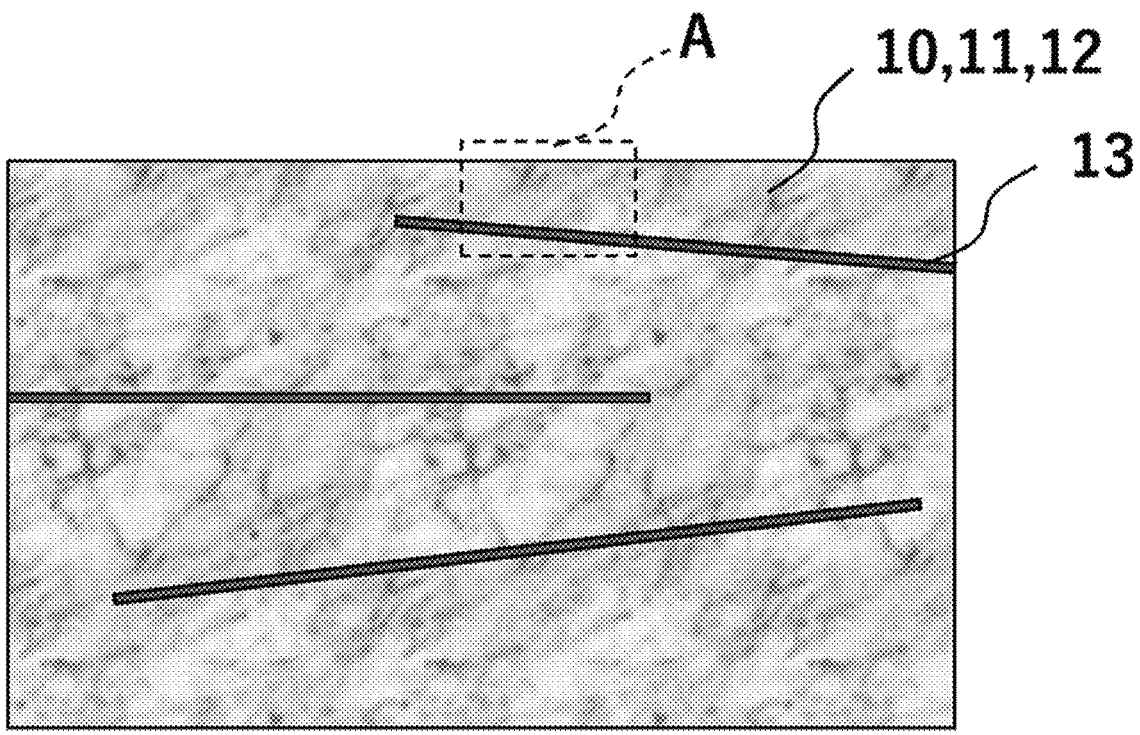
FIG. 1 is a diagram schematically showing a cross section of a porous carbon structure of the present invention.

FIG. 1 is a diagram schematically showing a cross section of a porous carbon structure of the present invention.

Figure 2:
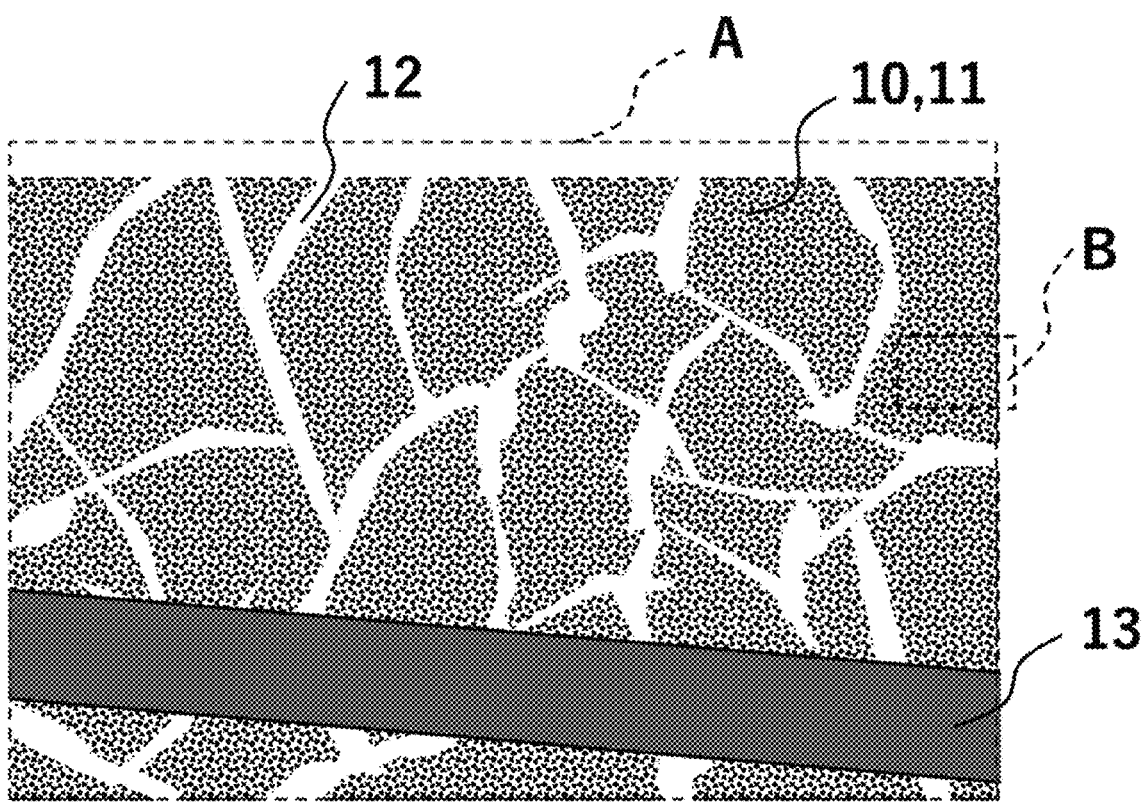
FIG. 2 is an enlarged view of a part A in FIG. 1.

FIG. 2 is an enlarged view of a part A in FIG. 1.

Figure 3:
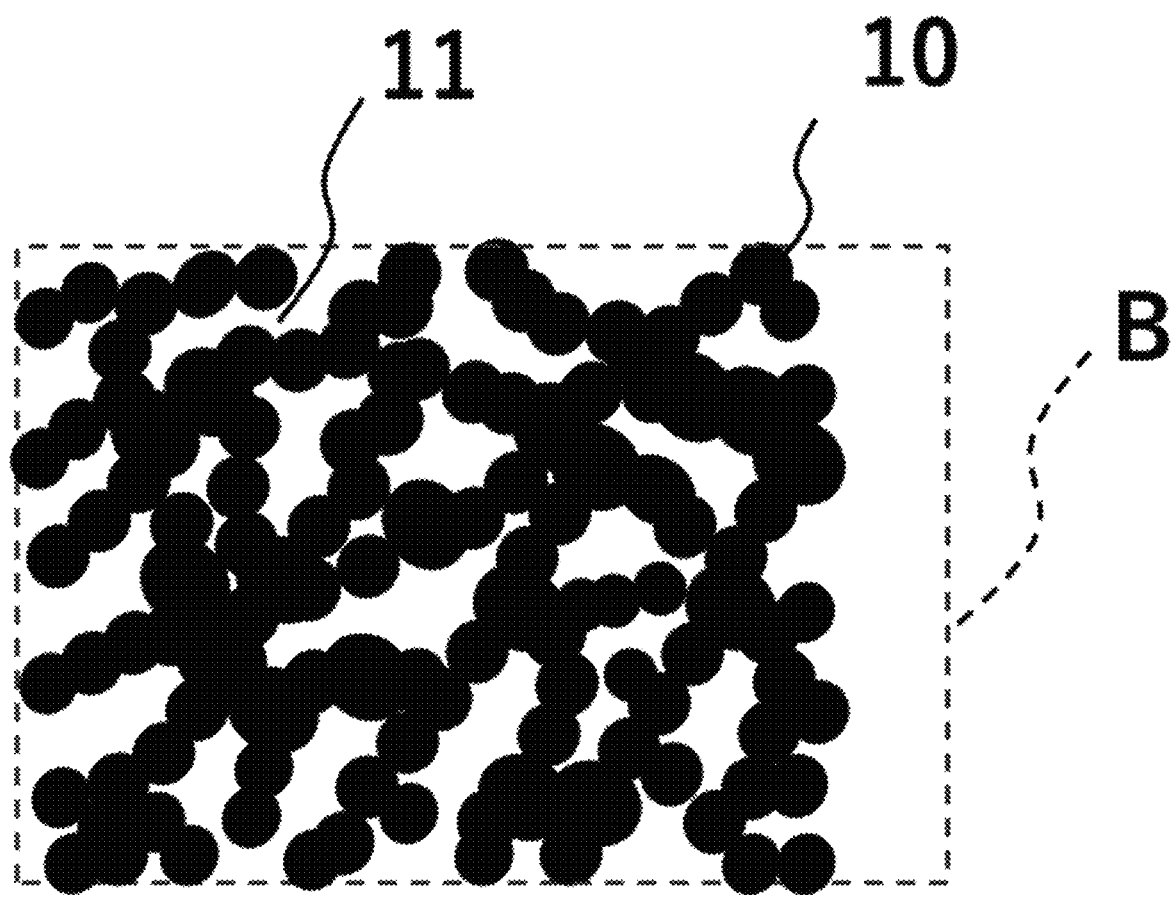
FIG. 3 is an enlarged view of a part B in FIG. 2.

FIG. 3 is an enlarged view of a part B in FIG. 2.

The porous carbon structure of the present invention has a skeleton 10 containing carbon, and a large number of pores 11 and 12. Furthermore, the porous carbon structure of the present invention satisfies all of conditions (a) to (d) shown as follows:

(a) a t-plot external specific surface area is in a range of 300 $m^2/g$ or more and 1,600 $m^2/g$ or less;

(b) a pore volume of the pores having a diameter of 1 nm or more and 200 nm or less is in a range of 1.2 $cm^3/g$ or more and 7.0 $cm^3/g$ or less;

(c) a pore volume of the pores having a diameter of 1 nm or more and 1,000 nm or less is in a range of 2.3 $cm^3/g$ or more and 10.0 $cm^3/g$ or less; and (d) an overall porosity is in a range of 80% or more and 99% or less.

Each of the above-mentioned conditions (a) to (d) will be in detail described below.

The "t-plot external specific surface area" in the above-mentioned condition (a) is determined from a graph of an adsorption isotherm obtained by nitrogen adsorption measurement, the graph plotting the layer thickness of adsorbed nitrogen on the horizontal axis and the amount of adsorbed nitrogen on the vertical axis. A numerical value obtained by subtracting the t-plot external specific surface area from the specific surface area according to the BET (Brunauer-Emmett-Teller) method, which is also determined by nitrogen adsorption measurement, is defined as the t-plot micropore specific surface area. The pores represented as t-plot micropores are too small to allow entry of lithium ions and oxygen, and hardly contribute to a discharge reaction. That is, the t-plot external specific surface area represents a specific surface area of pores effective for a discharge reaction and further a charge reaction. The definition of pores is described by the IUPAC, and micropores are defined as pores having a pore diameter of less than 2 nm, mesopores are defined as pores having a pore diameter of 2 nm or more and less than 50 nm, and macropores are defined as pores having a pore diameter of 50 nm or more.

In the porous carbon structure of the present invention, the t-plot external specific surface area is in the range of the above-mentioned condition (a) (that is, the area is in the range of 300 $m^2/g$ or more and 1,600 $m^2/g$ or less).

Since the porous carbon structure has a t-plot external specific surface area of 300 $m^2/g$ or more, the problem is avoided that the porous carbon structure has lower air permeability and ion transport efficiency, and a reaction field when used as a positive electrode structure of a battery becomes narrower, which may occur when the t-plot external specific surface area is less than the above-mentioned value.

In addition, since the porous carbon structure has a t-plot external specific surface area in the range of 1,600 $m^2/g$ or less, the problem is avoided that micropores tend to relatively increase, so that entry of lithium ions and oxygen may be difficult, which may occur when the t-plot external specific surface area is more than the above-mentioned value.

When the lower limit of the t-plot external specific surface area is 900 $m^2/g$ or more, it is easier to avoid the problem that the fields where lithium ions and oxygen react with each other are reduced, so that the discharge capacity may decrease. Therefore, the lower limit of the t-plot external specific surface area is preferably 900 $m^2/g$ or more.

The t-plot external specific surface area is preferably in the range of 900 $m^2/g$ or more and 1,600 $m^2/g$ or less. When the t-plot external specific surface area is in the above-mentioned range, in a case where Li ions and oxygen react with each other in a discharge reaction to generate lithium peroxide, there are many reaction fields required for oxygen to receive electrons supplied from the positive electrode. This makes more electron-transfer possible.

In combination with the above-mentioned condition (c) "a pore volume of pores having a diameter of 1 nm or more and 1,000 nm or less is in the range of 2.3 $cm^3/g$ or more and 10.0 $cm^3/g$ or less" (preferably "a pore volume of pores having a diameter of 1 nm or more and 1,000 nm or less in the range of 4.0 $cm^3/g$ or more and 10.0 $cm^3/g$ or less", and more preferably "a pore volume of pores having a diameter of 1 nm or more and 1,000 nm or less in the range of 4.1 cm³/g or more and 9.0 cm³/g or less"), a battery having high discharge capacity can be provided.

This makes more electrons transfer possible, similarly in the charge reaction as well, for a reason that there are many reaction fields that lithium peroxide transfers electrons to the positive electrode to come to be Li ions and oxygen. In combination with the above-mentioned condition (e) "a pore volume of pores having a diameter of 200 m or more and 10,000 nm or less in the range of 2.3 cm³/g or more and 10.0 cm³/g or less" (preferably "a pore volume of pores having a diameter of 200 nm or more and 10,000 nm or less in the range of 2.3 cm³/g or more and 8.0 cm³/g or less"), high-speed charging becomes possible.

The t-plot external specific surface area is more preferably in the range of 930 m²/g or more and 1,500 m²/g or less. Such a value enables high discharge capacity and high-speed charging. The t-plot external specific surface area is further more preferably 950 m²/g or more and 1,400 m²/g or less. Such a value enables further higher discharge capacity and high-speed charging.

The above-mentioned condition (b) "a pore volume of pores having a diameter of 1 nm or more and 200 nm or less in the range of 1.2 cm³/g or more and 7.0 cm³/g or less" means that the pore volume and the number of pores are large although the pores included in this range have a relatively small pore diameter. The pores having a diameter of 1 nm or more and 200 nm or less may correspond to the pores 11 in FIGS. 2 and 3. The pore volume is determined by means of the BJH method from an adsorption isotherm obtained by nitrogen adsorption measurement.

When such a porous carbon structure of the present invention is used in a positive electrode of an air battery, more fields where lithium ions and oxygen react with each other during discharge becomes to be given, and thus a battery exhibiting high discharge capacity can be provided.

Since the pore volume of pores having a diameter of 1 nm or more and 200 nm or less is in the range of the above-mentioned condition (b) (that is, the pore volume is in the range of 1.2 cm³/g or more and 7.0 cm³/g or less), the problem is avoided that the discharge capacity tends to decrease, which may occur when the pore volume is smaller than the above-mentioned range, and the problem is avoided that the pore volume of pores having a diameter of 200 nm or more relatively decreases, whereby the oxygen permeability and diffusivity decreases, and the discharge characteristics at high load, that is, the discharge capacity at high speed may decrease, which may occur when the pore volume is larger than the above-mentioned range. The lower limit of the pore volume is preferably in the range of 2.2 cm³/g or more, and more preferably 2.4 cm³/g or more, and the upper limit of the pore volume is preferably in the range of 7.0 cm³/g or less, and more preferably 6.0 cm³/g or less. Such a value may enable the battery to have a large discharge capacity. Such a value may enable the battery to have even larger discharge capacity.

The above-mentioned condition (c) "a pore volume of pores having a diameter of 1 nm or more and 1,000 nm or less in the range of 2.3 cm³/g or more and 10.0 cm³/g or less" means that in the porous carbon structure of the present invention, the pore volume of pores having a diameter in the above-mentioned range is considerably large. The pores having a diameter of 1 nm or more and 1,000 nm or less may correspond to the pores 11 in FIGS. 2 and 3. The pore volume is determined by means of the BJH (Barrett-Joyner-Hallenda) method from an adsorption isotherm obtained by nitrogen adsorption measurement.

When such a porous carbon structure of the present invention is used in a positive electrode (positive electrode structure) of an air battery, more lithium peroxide generated by discharge can be stored, and a battery having high discharge capacity characteristics can be provided. In addition, since the pores in this pore range have a large pore volume, permeation and diffusion of air or oxygen is facilitated in the porous carbon structure. Therefore, air or oxygen introduced into the positive electrode from the outside of the battery can spread at high speed throughout the carbon particles forming the carbon skeleton. Furthermore, since the pores in this pore range have a large pore volume, lithium (Li) ions move smoothly, and in combination with high air or oxygen permeability and diffusivity, an air battery excellent in high-speed discharge characteristics, that is, high-load characteristics can be provided.

Since the pore volume of pores having a diameter of 1 nm or more and 1,000 nm or less is in the range of the above-mentioned condition (c) (that is, the pore volume is in the range of 2.3 cm³/g or more and 10.0 cm³/g or less), the problem is avoided that the discharge capacity and high-load characteristics tend to decrease, which may occur when the pore volume is smaller than the above-mentioned range, and the problem is avoided that although larger discharge capacity and high-load characteristics can be expected, the porous carbon structure may have lower strength, which may occur when the pore volume is larger than the above-mentioned range. The lower limit of the pore volume is preferably in the range of 4.0 cm³/g or more, and more preferably 4.1 cm³/g or more, and the upper limit of the pore volume is preferably in the range of 10.0 cm³/g or less, and more preferably 9.0 cm³/g or less. Such a value may enable the achievement of larger discharge capacity and high-load characteristics. Thus, even larger discharge capacity and high-load characteristics can be achieved, and the porous carbon structure is easy to be self-supportable.

The "porosity" in the above-mentioned condition (d) is determined from the apparent density and the true density of the porous carbon structure according to the following calculation formula: (1−apparent density of porous carbon structure/true density of constituent material of porous carbon structure)×100.

That the "porosity" of the porous carbon structure of the present invention is in the range of the above-mentioned condition (d) (that is, the overall porosity is in the range of 80% or more and 99% or less) means that the porous carbon structure has a sufficiently high porosity. When such a porous carbon structure is used in a positive electrode of an air battery, a large amount of lithium peroxide generated by discharge can be stored, and entry of air or oxygen from the outside of the battery into the positive electrode is smoothly performed with less resistance, so that a battery having high discharge capacity and capable of discharging at high speed can be provided.

Since the porous carbon structure of the present invention has an overall porosity of 80% or more, the problem is avoided that the porous carbon structure has lower air permeability and ion transport efficiency, and the reaction field when used as a positive electrode structure of a battery becomes narrower, which may occur when the overall porosity is less than the above-mentioned value.

In addition, since the porous carbon structure has an overall porosity of 99% or less, the problem is avoided that rigidity as a porous carbon structure is reduced, the porous carbon structure becomes brittle, and the porous carbon structure may hardly have self-supporting ability, which may occur when the overall porosity is more than the above-mentioned value.

When the lower limit of the overall porosity is 90% or more, it is easier to avoid the problem that the production field of lithium peroxide is reduced and the entry of air or oxygen is delayed, so that the discharge capacity and high-load characteristics may decrease. Therefore, the lower limit of the overall porosity is preferably 90% or more. The lower limit of the porosity is more preferably 91% or more, and further more preferably 92% or more.

The upper limit of the porosity is not particularly limited, but is preferably 99% or less, and more preferably 98% or less.

Other requirements on the porous carbon structure of the present invention are not particularly limited as long as the porous carbon structure satisfies all of the above-mentioned conditions (a) to (d).

The porous carbon structure of the present invention may contain carbon fibers 13. In an example, the carbon fibers 13 may be carbon fibers having a fiber diameter of 0.1 μm or more and 20 μm or less and a length of 1 mm or more and 20 mm or less. This can increase the strength of the porous carbon structure.

The porous carbon structure of the present invention preferably satisfies the above-mentioned condition (e) "a pore volume of pores having a diameter of 200 nm or more and 10,000 nm or less in the range of 2.3 $cm^3/g$ or more and 8.0 $cm^3/g$ or less".

Figure 8:
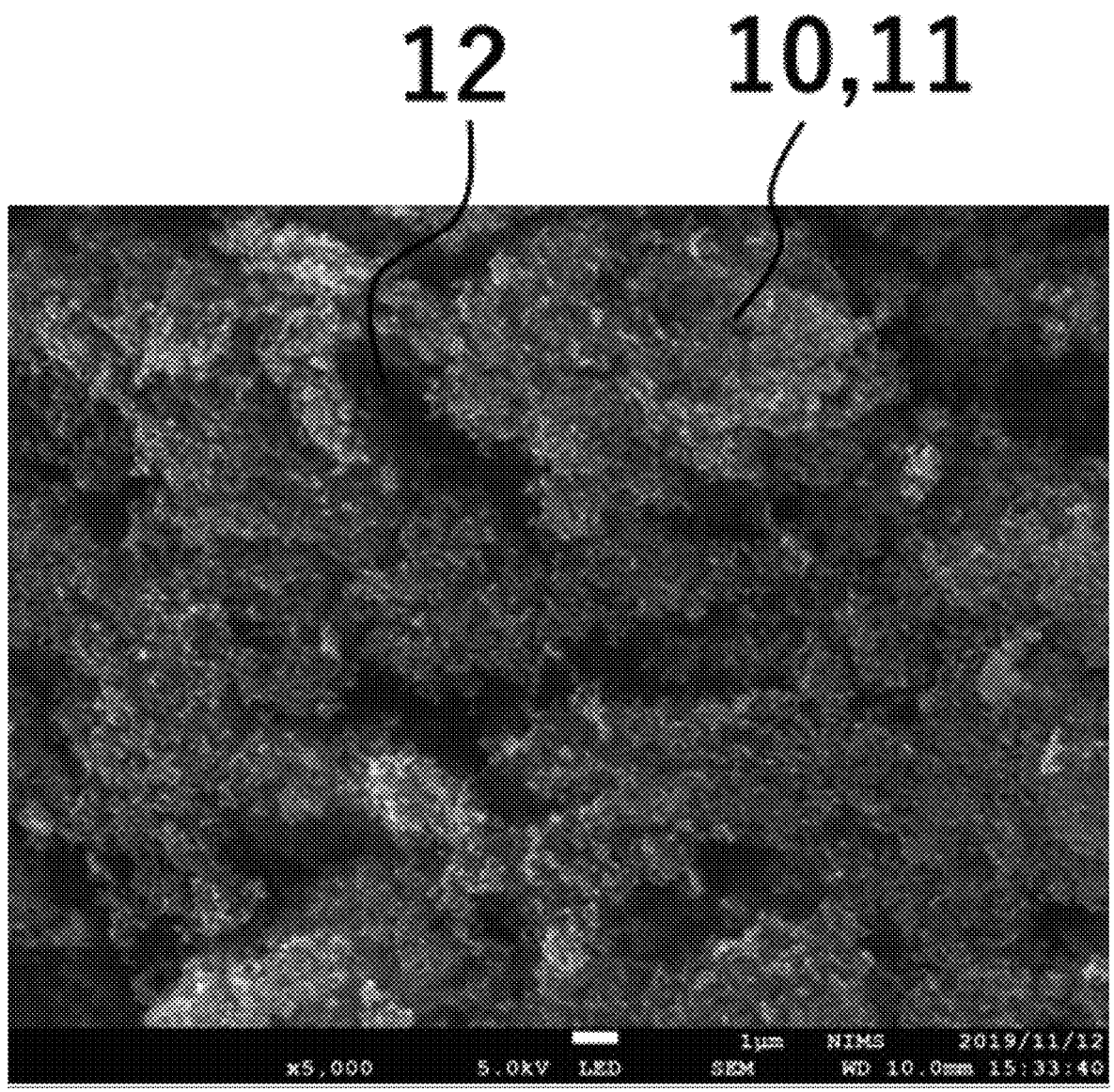
FIG. 8 is a SEM image (magnification: 5,000) of a sample of porous carbon structure No. 5.

An image of pores satisfying the above-mentioned condition (e) "a pore volume of pores having a diameter of 200 nm or more and 10,000 nm or less in the range of 2.3 $cm^3/g$ or more and 8.0 $cm^3/g$ or less" corresponds to the pores 12 in FIG. 2 and FIG. 8. The pore volume of pores having a diameter of 200 m or more and 10,000 nm or less is determined using a value obtained by the mercury intrusion method.

The pores in this region mainly serve to allow oxygen outside the battery to enter the inside of the porous carbon structure as a positive electrode. Since the pore volume in this region is sufficiently large, a sufficient amount of oxygen can enter at high speed in the course in which lithium ions react with oxygen to generate lithium peroxide. Thus, using the porous carbon structure of the present invention in a positive electrode can provide a battery having a large discharge capacity at a high current density, that is, excellent high-load characteristics. Also, in charging, lithium peroxide transfers electrons to the electrode and is decomposed into Li ions and oxygen. Since the pore volume of pores having a diameter of 200 nm or more and 10,000 nm or less is in the above-mentioned range, the generated oxygen leaves the porous carbon structure more easily, and high-speed charging becomes possible.

Since the pore volume of pores having a diameter of 200 nm or more and 10,000 nm or less is in the range of the above-mentioned condition (e) (in the range of 2.3 $cm^3/g$ or more and 8.0 $cm^3/g$ or less), the problem is avoided that the entry speed of oxygen is reduced and high-load characteristics may be lowered, which may occur when the pore volume is smaller than the above-mentioned range, and the problem is avoided that the porous carbon structure may have lower strength, which may occur when the pore volume is larger than the above-mentioned range. The lower limit of the pore volume is preferably in the range of 2.5 $cm^3/g$ or more, and more preferably 2.6 $cm^3/g$ or more, and the upper limit of the pore volume is preferably in the range of 7.0 $cm^3/g$ or less, and more preferably 6.5 $cm^3/g$ or less. Such a value may enable the battery to have high-load characteristics. Such a value may enable the battery to have high-load characteristics while maintaining the strength of the porous carbon structure.

The pore volume of pores having a diameter of 1 nm or more and 200 nm or less in the above-mentioned condition (b) and the pore volume of pores having a diameter of 200 nm or more and 10,000 nm or less in the above-mentioned condition (e) are not particularly limited as long as the pore volumes are respectively in the above-mentioned ranges. However, it is more preferred that the pore volume of pores having a diameter of 200 nm or more and 10,000 nm or less in the above-mentioned condition (e) be about the same as the pore volume of pores having a diameter of 1 nm or more and 200 nm or less in the above-mentioned condition (b), and it is still more preferred that the pore volume of pores having a diameter of 200 nm or more and 10,000 nm or less in the above-mentioned condition (e) be larger than the pore volume of pores having a diameter of 1 nm or more and 200 nm or less in the above-mentioned condition (b). The pores having a diameter of 200 nm or more and 10,000 nm or less in the above-mentioned condition (e) mainly serve to allow oxygen outside the battery to enter the inside of the porous carbon structure as a positive electrode during the discharge process and to allow oxygen generated during the charge process to leave from the porous carbon structure, and also serve to store lithium peroxide generated during the discharge. Therefore, when the pore volume of pores having a diameter of 200 nm or more and 10,000 nm or less in the above-mentioned condition (e) is equal to or larger than the pore volume of pores having a diameter of 1 nm or more and 200 nm or less in the above-mentioned condition (b), a battery having both high-speed charge-discharge characteristics and high-capacity characteristics can be obtained.

The porous carbon structure of the present invention preferably has an apparent density in the range of 0.05 $g/cm^3$ or more and 0.20 $g/cm^3$ or less. When the apparent density of the porous carbon structure is in the above-mentioned range, the porous carbon structure has sufficient pores necessary for permeation and diffusion of oxygen, and has sufficient strength. As described above, since the porous carbon structure of the present invention has self-supporting ability, the porous carbon structure can serve as a positive electrode of an air battery without using a metal mesh or the like. This makes the reduction of the weight and size of the battery, the improvement of the productivity, and the cost reduction possible.

Specifically, since the apparent density is in the above-mentioned range (in the range of 0.05 $g/cm^3$ or more and 0.20 $g/cm^3$ or less), the problem is avoided that the strength of the porous carbon structure may be reduced and it may be necessary to attach the porous carbon structure to a current collector such as a metal mesh to form a positive electrode, which may occur when the apparent density is smaller than the above-mentioned range, and the problem is avoided that the amount of pores in the porous carbon structure may be relatively small, and the capacity and load characteristics may decrease, which may occur when the apparent density is larger than the above-mentioned range. The lower limit of the apparent density is preferably in the range of 0.07 $g/cm^3$ or more, and more preferably 0.09 $g/cm^3$ or more, and the upper limit of the apparent density is preferably in the range of 0.18 $g/cm^3$ or less, and more preferably 0.17 $g/cm^3$ or less. As a result, the porous carbon structure can have pores and have high strength. As a result, the porous carbon structure of the present invention can further have more pores and higher strength.

The skeleton manly contains carbon. It is more preferred that the skeleton contain carbon preferably in an amount of 90 wt % or more, and more preferably in an amount of 93 wt % or more. When the amount of carbon is 90 wt % or more, the ion transport efficiency is easily increased, and the reaction field is easily widened when used as a positive electrode structure of a battery.

Also, the skeleton preferably contains conductive carbon, and is more preferably made of conductive carbon. Since the skeleton contains conductive carbon or the skeleton is made of conductive carbon, the porous carbon structure increases electroconductivity, and a battery using the porous carbon structure as a positive electrode structure increases electroconductivity. As a result, the internal resistance of the battery is reduced, and the output of the battery is improved.

The content of fluorine (F) in the porous carbon structure of the present invention may be 0.002 mg or less (0.0002 mass % or less) per 1 g of the porous carbon structure. In the porous carbon structure of the present invention, since it is not necessary to use a fluorine-containing polymer binder as a binding polymer material, the content of fluorine can be set equal to or less than the above-mentioned value.

The porous carbon structure of the present invention preferably has a BET specific surface area of 300 $m^2/g$ or more and 1,600 $m^2/g$ or less. Since the porous carbon structure has a BET specific surface area in the above-mentioned numerical range, the problem is avoided that the porous carbon structure has lower air permeability and ion transport efficiency, and a reaction field when used as a positive electrode structure of a battery becomes narrower, which may occur when the BET specific surface area is smaller than the above-mentioned numerical range, and further the problem is avoided that rigidity as a structure is reduced, the porous carbon structure becomes brittle, and the porous carbon structure hardly has self-supporting ability, which may occur when the BET specific surface area is larger than the above-mentioned numerical range. When the problem is avoided, in a case where the porous carbon structure is desired to be used as a positive electrode structure, since the porous carbon structure is self-supportable, it is not necessary to make the porous carbon structure a powder and make the powder supported in a metal electrode container or the like. Therefore, the reduction of the weight and size of the battery, the improvement of the productivity, and the cost reduction are made to be possible.

The lower limit of the BET specific surface area is more preferably 400 $m^2/g$ or more, and more preferably 500 $m^2/g$ or more, and the upper limit of the BET specific surface area is more preferably 1,500 $m^2/g$ or less, and further more preferably 1,400 $m^2/g$ or less.

In the porous carbon structure of the present invention, the SA ratio (=[t-plot external specific surface area/BET specific surface area (=t-plot external specific surface area+t-plot micropore specific surface area)]×100) is preferably 30% or more.

When the SA ratio satisfies the above-mentioned value, the problem is avoided that in the porous carbon structure, the reaction field when used as a positive electrode structure of a battery is reduced, and the air permeability and the ion transport efficiency are reduced, which may occur when the SA ratio is smaller than the above-mentioned value.

Second Embodiment

In the second embodiment, an exemplary method for manufacturing the porous carbon structure of the present invention will be described.

The porous carbon structure of the present invention can be achieved by a manufacturing method including the following steps: preparing a mixture slurry containing porous carbon particles and a binding polymer material, molding the mixture slurry, immersing a sample obtained by the molding step in a solvent in which the binding polymer material has low solubility, drying the sample obtained by the immersing step, and subjecting the sample obtained by the drying step to a carbonization treatment. In the carbonization treatment step during the manufacturing process, for example, the carbonization treatment is performed in an atmosphere of an oxidizing gas or an inert gas.

Figure 4:
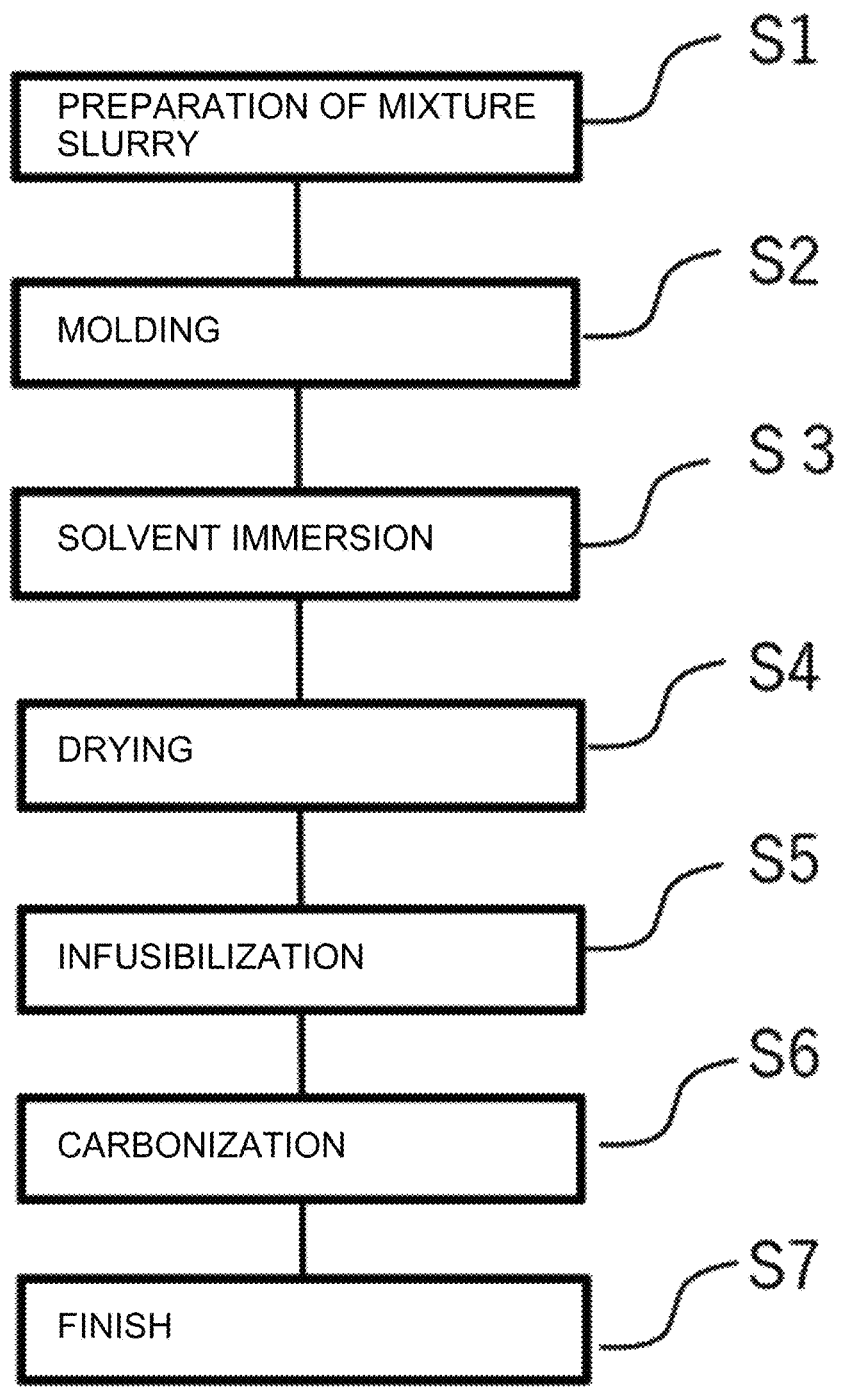
FIG. 4 is a flowchart showing a process for manufacturing the porous carbon structure of the present invention.

FIG. 4 is a flowchart showing a process for manufacturing the porous carbon structure of the present invention.

First, a mixture slurry is prepared (step S1).

The mixture preferably contains 50 wt % or more and 85 wt % or less of porous carbon particles, 1 wt % or more and 15 wt % or less of carbon fibers, 5 wt % or more and 49 wt % or less of a binding polymer material, and a solvent for uniformly dispersing these materials.

The carbon fibers are not necessarily required, but it is more preferable to include the carbon fibers because the carbon fibers exhibit an effect of reinforcing the porous carbon structure.

As the porous carbon particles, carbon black containing Ketjen Black (registered trademark), and in addition, carbon particles formed by a template method, and the like can be used.

The porous carbon particles preferably satisfy the conditions of a BET specific surface area in the range of 1,000 $m^2/g$ or more and 1,500 $m^2/g$ or less, a pore volume of pores having a diameter of 1 nm or more and 1,000 nm or less in the range of 3.0 $cm^3/g$ or more and 4.0 $cm^3/g$ or less, and a pore volume of pores having a diameter of 1 nm or more and 200 nm or less in the range of 2.0 $cm^3/g$ or more and 3.0 $cm^3/g$ or less. Use of such porous carbon particles as a raw material makes it easier to obtain a porous carbon structure satisfying the above-mentioned conditions (a) to (d).

As the carbon fibers, carbon fibers having a fiber diameter of 0.1 μm or more and 20 μm or less and a length of 1 mm or more and 20 mm or less can be used.

As the binding polymer material, a polymer material such as polyacrylonitrile (PAN), polysulfone, or a solvent-soluble polyimide can be used. It is preferred to use a polymer material containing no fluorine (F) element in view of environmental problems and the like.

Examples of the solvent include dimethyl sulfoxide (DMSO), N-methylpyrrolidone (NMP), dimethylformamide (DMF), and dimethylacetamide (DMA).

Next, a molding (forming) step is performed (step S2).

The molding method of the mixture slurry is not particularly limited, and examples thereof include a wet film forming method using a well-known doctor blade or the like.

Examples of the molding method also include a roll coater method, a die coater method, a spin coating method, and a spray coating method.

The shapes after being molded can have various ones depending on the purpose. For example, the mixture slurry is formed into a sheet shape having a uniform thickness.

Thereafter, a solvent immersion step is performed (step S3).

In the solvent immersion step, the sample meaning the molded body obtained in step S2 is immersed in a solvent in which the binding polymer material has low solubility by means of a non-solvent induced phase separation method. Through this step, a porous film is formed.

Examples of the solvent include water, alcohols such as ethyl alcohol, methyl alcohol, and isopropyl alcohol, and mixed solvents thereof.

Among them, water is preferred from the viewpoint of excellent handleability, and an alcohol is preferred from the viewpoint that a battery produced using a finally produced porous carbon structure has a feature of high discharge capacity.

Next, a drying step is performed (step S4).

In this step, the solvent is volatilized from the molded body (porous film) obtained in step S3. Examples of the drying method include a method of placing the formed body under a dry air environment, a reduced pressure drying method, and a vacuum drying method. In this drying step, in order to increase the drying speed, warming can be performed at a temperature exceeding the boiling point of the solvent.

Next, an infusibilizing treatment step is performed (step S5).

This treatment is performed for the purpose of preventing the binding polymer material from being melted and separated to deform the shape of the molded body in the subsequent carbonization treatment step. Specifically, the infusibilizing treatment can be achieved by subjecting the binding polymer material to oxidative crosslinking to solidify the binding polymer material. The infusibilizing treatment is performed by heating with an oven furnace, infrared irradiation, or the like under the air flow. The temperature is preferably 250° C. or more and 350° C. or less. When the temperature is set to 250° C. or more, the problem is avoided that oxidative crosslinking of the binding polymer material may be insufficient so that the binding polymer material may be melted in the subsequent carbonization step. When the temperature is set to 350° C. or less, the problem is avoided that decomposition of the binding polymer material may occur. This step may be omitted depending on the type of the used binding polymer material or the type of the oxidizing gas in the subsequent carbonization treatment step.

Next, a carbonization treatment step is performed (step S6).

By this treatment, the binding polymer is polycondensed to be changed to carbon, and this carbon strongly binds the porous carbon particles to each other. Through the carbonization treatment, a porous carbon structure having self-supporting ability is manufactured.

The carbonization treatment is not particularly limited as long as the above object can be achieved, but for example, the carbonization treatment can be performed in an atmosphere of an oxidizing gas or an inert gas. In this case, the carbonization treatment is preferably performed in an oxidizing gas atmosphere. It is more preferred that the carbonization treatment be performed in an oxidizing gas atmosphere, and then an additional carbonization treatment be performed in an inert gas atmosphere. The carbonization treatment performed in an oxidizing gas atmosphere burns off and eliminates a part of the binding polymer material, and further burns off and eliminates a part of the porous carbon particles as a raw material, and the binding polymer remaining between the porous carbon particles is carbonized to firmly bind the porous carbon particles to each other.

First, a case of performing the carbonization treatment step (carbonization treatment step) in an oxidizing gas atmosphere will be described.

When performing the carbonization treatment step (carbonization treatment step) in an oxidizing gas atmosphere, for example, the product obtained in step S4 or step S5 is preferably heat-treated in an oxidizing gas having an oxygen concentration in the range of more than 0.03% and less than 5%. In the present application, the carbonization treatment in an oxidizing gas atmosphere may be simply referred to as an oxidation treatment from such a viewpoint.

The oxidizing gas atmosphere may preferably be a gas containing oxygen, air, water, or carbon dioxide ($CO_2$). These gases can burn off and eliminate most of the binding polymer material, and further a part of the porous carbon particles. The oxidizing gas atmosphere more preferably further contains an inert gas such as an argon (Ar) gas, a nitrogen ($N_2$) gas, or a helium (He) gas.

When performing the carbonization treatment step (carbonization treatment step) in an oxidizing gas atmosphere, the oxygen concentration is preferably set in the range of more than 0.03% and less than 5% as described above. The oxygen concentration in the range of more than 0.03% and less than 5% is preferred from the viewpoint of achieving the above-mentioned object of the carbonization treatment. This is because the problem is avoided that the oxidation treatment tends not to proceed, which may occur when the oxygen concentration is less than the above-mentioned range, and the problem is avoided that the porous carbon structure may be excessively burned and split by the oxidizing gas or may have insufficient strength, which may occur when the oxygen concentration is more than the above-mentioned range. The oxygen concentration is more preferably in the range of 0.04% or more and 4% or less. At an oxygen concentration in the above-mentioned range, the oxidation treatment proceeds more efficiently. The oxygen concentration is further more preferably in the range of 0.05% or more and 4% or less. At an oxygen concentration in the above-mentioned range, the oxidation treatment proceeds even more efficiently, and the porous carbon structure of the present invention can be obtained with high efficiency. The oxygen concentration is further more preferably in the range of 0.2% or more and 2% or less. At an oxygen concentration in the above-mentioned range, the oxidation treatment proceeds even more efficiently, and the porous carbon structure of the present invention can be obtained with higher efficiency and high yield.

When water is used as an oxidizing gas atmosphere, the oxygen concentration is the concentration that is based on the amount of oxygen calculated from oxygen atoms contained in water.

The carbonization treatment may be performed in a state where the oxidizing gas is sealed in the furnace or may be performed while flowing the oxidizing gas in the furnace. In the case of flowing the oxidizing gas, the flow speed is not particularly limited, but is preferably in the range of 0.1 mL/min or more and $100^3$ L/min or less. When the flow speed is less than the above-mentioned range, oxidation may be difficult to proceed, and when the flow speed is more than the above-mentioned range, it may be disadvantageous in terms of cost. The flow speed is more preferably in the range of 1 mL/min or more and $100^3$ L/min or less, and further more preferably in the range of 10 mL/min or more and $10^3$ L/min or less.

The furnace used in the carbonization treatment is not particularly limited as long as the oxidizing gas can be sealed or flowed in the furnace, but an oven furnace, a tubular furnace, a box furnace, an infrared irradiation furnace, a graphite heater furnace, an induction heating furnace, a lead hammer furnace, an Atchison furnace, or the like can be used.

The temperature of the carbonization treatment is preferably in the temperature range of 350° C. or more and 3,000°

C. or less. When the temperature of the carbonization treatment is in the temperature range of 350° C. or more and 3,000° C. or less, the problem is avoided that a sufficient oxidation effect may not be obtained, which may occur when the temperature is less than the above-mentioned temperature range, and the problem is avoided that the porous carbon structure may be combusted and burned off, which may occur when the temperature is more than the above-mentioned temperature range. The temperature of the carbonization treatment is more preferably in the range of 400° C. or more and 2000° C. or less, and further more preferably 420° C. or more and 1500° C. or less.

The upper limit of the temperature rise speed in the carbonization treatment is preferably 100° C./min or less, more preferably 50° C./min or less, and further more preferably 30° C./min or less. When the upper limit of the temperature rise speed in the carbonization treatment is set as described above, the problem is avoided that the porous carbon structure tends not to be sufficiently subjected to the oxidation treatment, which may occur when the temperature rise rate is more than the above-mentioned value. The lower limit of the temperature rise rate is not particularly limited, but is preferably 0.01° C./min or more in terms of cost.

The carbonization treatment step is preferably performed until the pore volume of pores having a diameter of 1 nm or more and 1,000 nm or less in the product obtained by the carbonization treatment step (that is, the porous carbon structure of the present invention) increases to be larger than the pore volume of pores having a diameter of 1 nm or more and 1,000 nm or less in the porous carbon used as a raw material.

Specifically, it is preferred to perform the carbonization treatment step until the multiplying factor of the pore volume falls in the range of 1.02 times or more and 10.0 times or less. When the multiplying factor of the pore volume is less than the above-mentioned range, a sufficient oxidation effect may not be obtained, and when the multiplying factor of the pore volume is more than the above-mentioned range, a porous carbon structure having sufficient strength may not be obtained. The multiplying factor of the pore volume is more preferably in the range of 1.04 times or more and 8.0 times or less, and further more preferably in the range of 1.05 times or more and 5.0 times or less.

The porous carbon structure of the present invention is obtained (step S7) through the step of performing the carbonization treatment in an oxidizing gas atmosphere (step S6) as described above, and the carbonization treatment step can also be performed in an inert gas atmosphere instead of an oxidizing gas atmosphere.

The case of performing the carbonization treatment step (carbonization treatment step) in an inert gas atmosphere instead of an oxidizing gas atmosphere will be described.

In this case, the furnace used in the carbonization treatment is not particularly limited as long as the inert gas can be sealed or flowed in the furnace similarly to the case where the carbonization treatment step is performed in an oxidizing gas atmosphere, but an oven furnace, a tubular furnace, a box furnace, an infrared irradiation furnace, a graphite heater furnace, an induction heating furnace, a lead hammer furnace, an Atchison furnace, or the like can be used.

The temperature of the carbonization treatment is preferably in the temperature range of 800° C. or more and 3000° C. or less. In this temperature range, a problem is avoided that a sufficient carbonization effect may not be obtained. The temperature of the carbonization treatment is more preferably in the temperature range of 900° C. or more and 2500° C. or less.

The upper limit of the temperature rise speed in the carbonization treatment is preferably 100° C./min or less, more preferably 50° C./min or less, and further more preferably 30° C./min or less, similarly to the case where the carbonization treatment step is performed in an oxidizing gas atmosphere. When the upper limit of the temperature rise speed is set as described above, the problem is avoided that the porous carbon structure tends not to be sufficiently carbonized, which may occur when the temperature rise speed is more than the above-mentioned value. The lower limit of the temperature rise speed is not particularly limited, but is desirably 0.01° C./min or more in terms of cost.

The inert gas atmosphere is specifically a rare gas such as argon (Ar), nitrogen ($N_2$), or the like.

The porous carbon structure of the present invention is obtained (step S7) through the step of performing the carbonization treatment in an oxidizing gas atmosphere (step S6) as described above, and the porous carbon structure may be subjected to an additional carbonization treatment under an inert gas atmosphere subsequent to the carbonization treatment step (step S6) and prior to the step of obtaining the porous carbon structure of the present invention (step S7). As a result, the binding polymer material remaining in the contact part between the porous carbon particles and being involved in the bond between the porous carbon particles is carbonized, thereby making it possible to further strengthen the strength of the porous carbon structure in addition to an increase of the electron conductivity of the porous carbon structure.

The inert gas atmosphere is a rare gas such as argon (Ar), nitrogen ($N_2$), or the like. In particular, when the carbonization treatment in an oxidizing gas atmosphere is performed at a temperature of 800° C. or less, it is preferred to subsequently perform the carbonization treatment step in an inert gas atmosphere. As a result, the binding polymer material remaining in the contact part between the porous carbon particles and being involved in the bond between the porous carbon particles is carbonized, thereby making it possible to further strengthen the strength of the porous carbon structure in addition to an increase of the electron conductivity of the porous carbon structure.

As for the carbonization treatment step in an inert gas atmosphere, it is possible to directly switch, after the carbonization treatment in an oxidizing gas atmosphere (step S6), the atmosphere to an inert gas and raise the temperature to a predetermined carbonization temperature. Also, it is possible to take out the porous carbon structure after the carbonization treatment in an oxidizing gas atmosphere (step S6), and then subject the porous carbon structure to the additional carbonization treatment in an inert gas atmosphere.

The temperature of the carbonization treatment in an inert gas atmosphere is preferably 800° C. or more, and more preferably 900° C. or more. The upper limit of the temperature is not particularly limited, but is preferably 3,000° C. or less in terms of cost.

Through the above-mentioned steps, a porous carbon structure having sufficient and practical mechanical strength is manufactured due to having self-supporting ability. The molded body is entirely carbonized by the above heat treatment, and it is possible to provide, without using a resin binder or a current collector mesh that is not directly involved in a secondary battery reaction, a porous carbon structure that has, by itself, self-supporting ability and electron conductivity required of an electrode and also has excellent oxidation resistance. The porous carbon structure has self-supporting ability, and has all of high air or oxygen permeability, high ion transport efficiency, and a wide reaction field.

In particular, the carbonization treatment in an oxidizing gas atmosphere in step S6 burns off and eliminates the binding polymer material covering the surfaces of the porous carbon particles as a raw material that constitutes the porous carbon structure, so that the pore volume and the specific surface area of the pores originally possessed by the porous carbon particles become apparent. Furthermore, a part of the porous carbon particles themselves are also oxidized, so that the pore volume and the specific surface area of the pores of the obtained porous carbon structure increase to be more than those originally possessed by the porous carbon particles as a raw material. Since a part of the binding polymer material and the porous carbon particles are burned off, spaces between the particles increase accordingly. In addition, the manufactured porous carbon structure has sufficient and practical mechanical strength due to having self-supporting ability. This indicates that the binding polymer which exists between the porous carbon particles involved in the binding between the porous carbon particles is carbonized by the carbonization treatment while still being involved in the binding between the porous carbon particles. That is, it can be understood that the binding polymer involved in the binding between the porous carbon particles exists between the densely bound particles in a state of being carbonized by the carbonization treatment, and thus oxygen cannot enter. Meanwhile, it is understood that oxygen reaches the polymer on the surface of the porous carbon particles which are not involved in the bond with other particles through the mesopores and macropores formed in the porous carbon structure, and the polymer is oxidized and burned off.

The porous carbon structure of the present invention has a decreased H/C ratio because hydrogen (H) is desorbed and cyclization proceeds through the carbonization step. Furthermore, through the carbonization, porous carbon particles used as a raw material also have a reduced amount of H due to development of a covalent carbon network surface. The carbonization step of the present invention can provide a porous carbon structure having excellent oxidation resistance.

As described above, the amount of fluorine (F) contained in the porous carbon structure of the present invention may be 0.002 mg or less (0.0002 mass % or less) per 1 g of the porous carbon structure. In the porous carbon structure of the present invention, since it is not necessary to use a fluorine-containing polymer binder as a binding polymer material, the amount of fluorine can be set equal to or less than the above-mentioned value.

Meanwhile, in lithium ion batteries and lithium-air batteries that have been conventionally introduced, usually, a fluorine-based polymer material having excellent oxidation resistance is used as a binder used in a material for a positive electrode.

However, since the porous carbon structure of the present invention is obtained through the carbonization step, even when a non-fluorine-based binder is used as the binding polymer material, the binder component is carbonized, so that a structure having excellent oxidation resistance becomes to be formed.

Third Embodiment

In the third embodiment, a coin cell using the porous carbon structure described in the first embodiment as a positive electrode structure will be described with reference to FIGS. 5 and 6.

Figure 5:
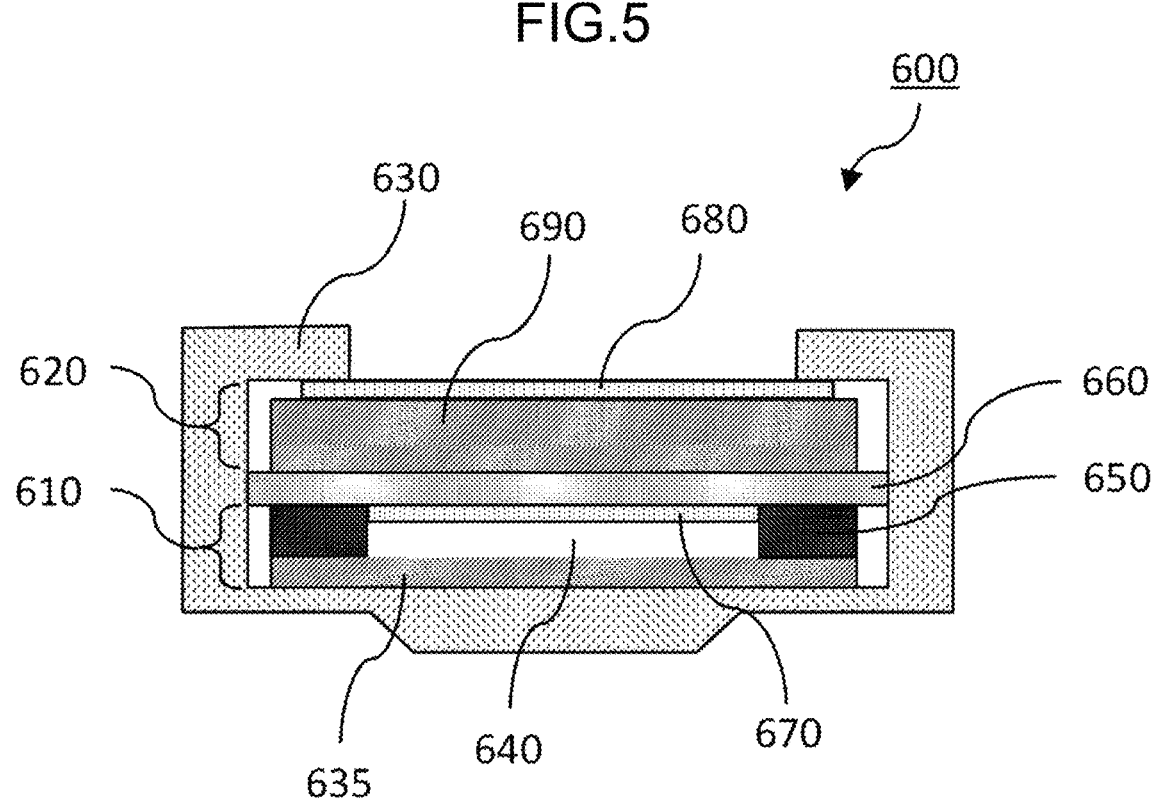
FIG. 5 is a schematic diagram illustrating a coin cell.

FIG. 5 is a schematic diagram illustrating a coin cell.
FIG. 6 is a schematic diagram illustrating another coin cell.

A coin cell 600 in the third embodiment includes a laminated structure in which a negative electrode structure 610 and a positive electrode structure 620 are laminated with a separator 660 interposed therebetween. The laminated structure is restrained by a coin cell type restraint tool 630. An insulating O-ring (not illustrated) is placed between the coin cell type restraint tool 630 and a metal mesh 680, and insulation between the restraint tool 630 and the positive electrode structure 620 is secured.

As can be understood from the fact that the air battery is named in the sense that oxygen in the air serves as the positive electrode active material of the battery, the supply of at least 21% of oxygen which is the oxygen concentration in the air is required. However, a higher concentration of oxygen is preferred in order to reduce the influence of diffusion control, and the air battery can exhibit the highest characteristics by supplying pure oxygen.

The negative electrode structure 610 may be a usually used negative electrode structure. Examples of the negative electrode structure include a structure having a current collector 635 and a metal layer 640 containing an alkali metal and/or an alkaline earth metal wherein the metal layer 640 is provided on the current collector 635. Here, the metal layer 640 can typically be a layer made of lithium metal.

The positive electrode structure 620 includes a porous carbon structure 690 described in the first embodiment wherein the porous carbon structure 690 is in mechanical and electrical contact with the metal-containing mesh (metal mesh) 680 that serves function as both a flow path through which air or oxygen passes and a current collector.

Figure 6:
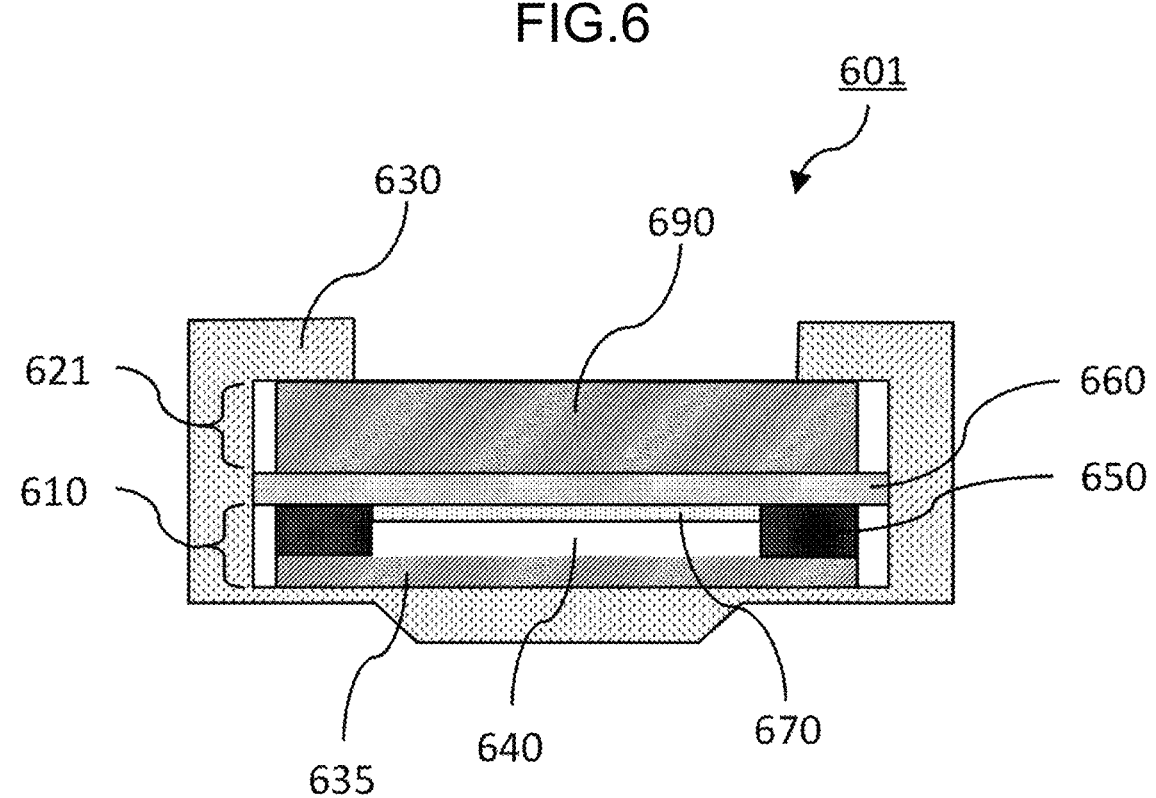
FIG. 6 is a schematic diagram illustrating another coin cell.

Alternatively, as shown in a coin cell 601 in FIG. 6, a positive electrode structure 621 includes only the porous carbon structure 690 described in the first embodiment. Here, the difference between the coin cell 600 and the coin cell 601 is only the presence or absence of the metal mesh 680. An insulating O-ring (not illustrated) is placed between the coin cell type restraint tool 630 and the porous carbon structure 690, and insulation between the restraint tool 630 and the positive electrode structure 621 is secured.

Here, since the positive electrode structure 620 including the metal mesh 680 increases electroconductivity and sufficiently secures the flow path for air or oxygen, this is a structure suitable for high output.

In contrast, since the positive electrode structure 621 consisting only of the porous carbon structure 690 does not include a metal mesh as a current collector, this is a structure which provides a high weight energy density of the battery, has a simple structure, is manufactured with the reduced number of steps, and can perform efficient manufacture. As described above, since the porous carbon structure 690 is a self-supporting body having sufficient rigidity, the porous carbon structure 690 can even alone serve as the positive electrode structure 621.

It is preferred that a groove (not illustrated) be formed in the porous carbon structure 690 to secure an additional flow path through which air or oxygen passes. Since the porous carbon structure 690 of the present invention has sufficient strength, it is possible to provide a groove for the air or oxygen flow. The width of the groove can be, for example, 0.1 mm or more and 3 mm or less. When the width of the groove is less than 0.1 mm, the air or oxygen flow is reduced. Even when the width of the groove is more than 3 mm, there is no large difference in the air or oxygen flow, but the strength of the porous carbon structure 690 becomes lower, and the porous carbon structure 690 is easily broken. It is preferred that a plurality of grooves be formed, and it is also desired that the grooves be formed in a grid pattern.

The separator 660 is placed between the negative electrode structure 610 and the positive electrode structure 620. A spacer 650 is formed between the separator 660 covering the metal layer 640. Moreover, a space 670 is formed between the metal layer 640, the spacer 650, and the separator 660, and the space 670 is filled with an electrolytic solution.

Next, a method for manufacturing the coin cell 600 will be described.

First, the negative electrode structure 610 is prepared. The negative electrode structure 610 is manufactured and prepared, for example, as follows.

On a disk-shaped current collector 635, a disk-shaped metal layer 640 made of lithium or the like is laminated wherein the disk-shaped metal layer 640 is concentric with the current collector 635 and has a diameter smaller than that of the current collector 635, and then a columnar spacer 650 is pressed on the current collector 635 to obtain the negative electrode structure 610.

Here, examples of the spacer 650 material include metal oxides, metal nitrides, and metal oxynitrides having insulating properties. Examples thereof include inorganic materials selected from the group consisting of $Al_2O_3$, $Ta_2O_5$, $TiO_2$, $ZnO$, $ZrO$, $SiO_2$, $B_2O_3$, $P_2O_5$, $GeO_2$, $Li_2O$, $Na_2O$, $K_2O$, $MgO$, $CaO$, $SrO$, $BaO$, $Si_3N_4$, $AlN$, and $AlO_xN_{1-x}$ ($0<x<1$). Among them, particularly $Al_2O_3$ and $SiO_2$ are easily available and have characteristics of excellent processability.

In an example, the spacer 650 may be made of an organic material selected from the group consisting of a polyolefin-based resin, a polyester-based resin, a polyimide-based resin, and a polyether ether ketone (PEEK)-based resin. The polyolefin-based resin is preferably polyethylene and/or polypropylene. The polyester-based resin is preferably selected from the group consisting of polyethylene terephthalate (PET), polybutylene terephthalate (PBT), polyethylene naphthalate (PEN), and polytributylene terephthalate (PTT). These resins are easily available and have excellent processability.

Next, the separator 660 is prepared and pressed on the spacer 650.

The material applied to the separator 660 is any inorganic material, organic material, or metal material which can pass alkali metal ions and/or alkaline earth metal ions, is an insulating material having a porous structure, and is not reactive with the metal layer 640 and an electrolytic solution.

There is no particular limitation as long as these conditions are satisfied, and a separator used in an existing metal battery can be used. For example, the separator 660 is selected from the group consisting of the following: a porous film made of a synthetic resin such as polyethylene, polypropylene, or polyolefin; glass fibers; and a nonwoven fabric.

It is preferred to provide the space 670 between the lithium metal 640, the spacer 650, and the separator 660.

Thereafter, the separator 660 is filled with an electrolytic solution. In this instance, the space 670 is also preferably filled with the electrolytic solution.

When a lithium salt is used as an alkali metal salt and/or an alkaline earth metal salt in a non-aqueous electrolytic solution, examples of the lithium salt include $LiPF_6$, $LiBF_4$, $LiSbF_6$, $LiSiF_6$, $LiAsF_6$, $LiN(SO_2C_2F_5)_2$, $Li(FSO_2)_2N$, $LiCF_3SO_3$ (LiTfO), $Li(CF_3SO_2)_2N(LiTFSI)$, $LiC_4F_9SO_3$, $LiClO_4$, $LiAlO_2$, $LiAlCl_4$, and $LiB(C_2O_4)_2$.

In the non-aqueous electrolytic solution, the non-aqueous solvent is selected from the group consisting of glymes (monoglyme, diglyme, triglyme, and tetraglyme), methyl butyl ether, diethyl ether, ethyl butyl ether, dibutyl ether, polyethylene glycol dimethyl ether, tetraethylene glycol dimethyl ether, cyclohexanone, dioxane, dimethoxyethane, 2-methyltetrahydrofuran, 2,2-dimethyltetrahydrofuran, 2,5-dimethyltetrahydrofuran, tetrahydrofuran, methyl acetate, ethyl acetate, n-propyl acetate, dimethyl acetate, methyl propionate, ethyl propionate, methyl formate, ethyl formate, dimethyl carbonate, diethyl carbonate, ethyl methyl carbonate, dipropyl carbonate, methyl propyl carbonate, ethyl propyl carbonate, ethylene carbonate, propylene carbonate, butylene carbonate, polyethylene carbonate, γ-butyrolactone, decanolide, valerolactone, mevalonolactone, caprolactone, acetonitrile, benzonitrile, nitromethane, nitrobenzene, triethylamine, triphenylamine, tetraethylene glycol diamine, dimethylformamide, diethylformamide, N-methylpyrrolidone, dimethylsulfone, tetramethylenesulfone, triethylphosphine oxide, 1,3-dioxolane, and sulfolane.

Thereafter, the positive electrode structure 620 placing a metal mesh on the porous carbon structure 690 produced by the manufacturing method described in the first embodiment is prepared.

Examples of the metal mesh 680 include a mesh containing a metal selected from the group of copper (Cu), tungsten (W), aluminum (Al), nickel (Ni), titanium (Ti), gold (Au), silver (Ag), platinum (Pt), and palladium (Pd). That is, examples of the metal mesh 680 include meshes containing a monometal selected from the above group, an alloy containing a metal selected from the above group, or a compound of a metal selected from the above group with carbon (C), nitrogen (N), or the like. The mesh can have a thickness of 0.2 mm and an aperture of 1 mm, for example.

Thereafter, the positive electrode structure 620 is stuck to the negative electrode structure 610 filled with the electrolytic solution via the separator 660 interposed therebetween, and the resulting product is restrained by the coin cell type restraint tool 630 to obtain the coin cell 600. Here, the mounting is preferably performed under dry air, for example, under dry air having a dew point temperature of −50° C. or less.

Through the above-mentioned steps, the coin cell 600 that operates as an air battery is manufactured.

In the case of manufacturing the coin cell 601, the positive electrode structure 620 to be prepared is required to be merely replaced with only the porous carbon structure 690 in the above-mentioned steps.

The coin cells 600 and 601 becomes an air battery which is capable of being reduced in size and weight as well as which is suitable for increasing the capacity. This is because in addition that the positive electrode structure 690 using the porous carbon structure described in the first embodiment has high air or oxygen permeability, is capable of taking in a large amount of oxygen, and further has both of high ion transport efficiency and a wide reaction field, its structure is a simple structure capable of being reduced in size which is the porous carbon structure alone or the porous carbon structure with a metal mesh placed thereon.

Fourth Embodiment

In the fourth embodiment, a laminated metal battery (air battery) using the porous carbon structure described in the first embodiment as a positive electrode structure will be described with reference to FIG. 7 that is a schematic diagram illustrating a cross-sectional structure of the air battery.

Figure 7:
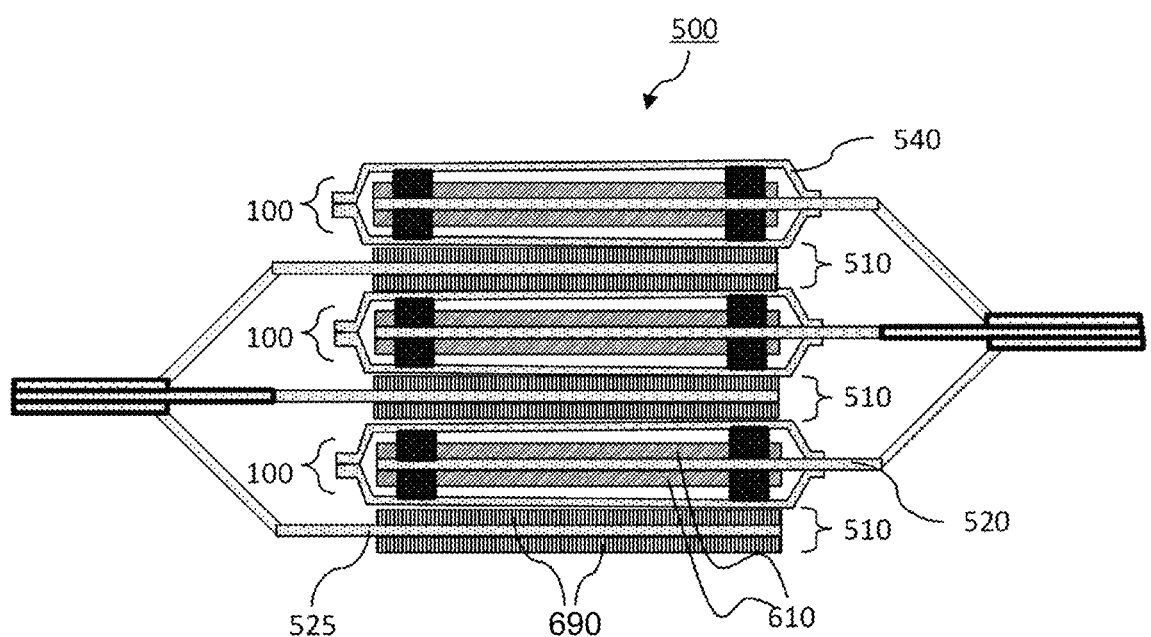
FIG. 7 is a schematic diagram illustrating a laminated metal battery (air battery).

FIG. 7 is a schematic diagram illustrating a laminated metal battery (air battery).

An air battery 500 in the fourth embodiment has a laminated structure in which a positive electrode structure 510 and a negative electrode structure 100 are laminated via a separator 540 interposed therebetween. The number of laminated layers may be one or more pairs, and there is no particular upper limit on the number of the pairs. Here, one pair is formed from one positive electrode structure 510 and one negative electrode structure 100, and this is defined as one unit.

Here, the negative electrode structure 100 has a configuration in which the negative electrode structures 610 described in the third embodiment are placed above and below a negative electrode current collector electrode 520 interposed therebetween, and the positive electrode structure 510 also has a configuration in which the porous carbon structures 690 described in the first embodiment are placed above and below a positive electrode current collector electrode 525 interposed therebetween wherein the positive electrode current collector electrode 525 also serves as a flow path for air or oxygen. The formation of a battery capable of providing a larger capacity by such a simple laminated structure is also characteristics peculiar to a porous carbon structure positive electrode having self-supporting ability.

Examples of the negative electrode current collector electrode 520 include an electrode containing a metal selected from the group of copper (Cu), tungsten (W), nickel (Ni), titanium (Ti), gold (Au), silver (Ag), platinum (Pt), and palladium (Pd). Examples of the positive electrode current collector electrode 525 include an electrode containing a metal selected from the group of stainless steel (SUS), tungsten (W), aluminum (Al), nickel (Ni), titanium (Ti), gold (Au), silver (Ag), platinum (Pt), and palladium (Pd). That is, examples of the current collector electrodes 520 and 525 include electrodes containing a simple metal selected from this group, an alloy containing a metal selected from this group, or a compound of a metal selected from this group with carbon (C), nitrogen (N), or the like. Since the positive electrode current collector electrode 525 also serves as an oxygen flow path, it is necessary to use a porous metal such as a mesh, a grid, or a sponge. The laminated structure is housed in a housing container (not illustrated).

The air battery 500 becomes an air battery which is capable of being reduced in size and weight as well as which is suitable for increasing the capacity. This is because in addition that the positive electrode structure 510 using the porous carbon structure described in the first embodiment has high air or oxygen permeability, is capable of taking in a large amount of oxygen, and further has both of high ion transport efficiency and a wide reaction field, its structure is a simple structure capable of being reduced in size which is the porous carbon structure alone or the porous carbon structure with a metal mesh placed thereon.

In the fourth embodiment, the air battery using the positive electrode structure 510 of the present invention has been described in detail with reference to FIG. 7, but the positive electrode structure 510 of the present invention can be applied to any metal battery without limitation to the air battery.

Next, the present invention will be described in detail with reference to specific examples, but it should be noted that the present invention is not limited to these examples.

EXAMPLES

The preparation of samples of the porous carbon structure of the present invention and properties of the produced porous carbon structure samples will be described in comparison with comparative samples.

In the following, the samples referred to as Porous carbon structure Nos. 1 to 8 and 10 to 16 are porous carbon structure samples of the present invention produced in the examples, and the samples referred to as Porous carbon structure Nos. 9 and 17 to 25 are comparative samples (comparative examples).

Example 1A: Porous Carbon Structure

In Example 1A, the preparation of porous carbon structure samples of the present invention (Porous carbon structure Nos. 1 to 8 and 10) and a comparative sample (Porous carbon structure No. 9), and properties of the produced porous carbon structure samples and the comparative sample are described.

(Preparation of Porous Carbon Structures)

First, a mixture slurry was prepared using the following: 65 wt % of porous carbon particles; 12 wt % of carbon fibers; 23 wt % of a binding polymer material; and a solvent containing N-methylpyrrolidone to uniformly disperse the above-mentioned components (step S1 in FIG. 4).

Here, as the porous carbon particles, Ketjen Black (registered trademark) (EC600J manufactured by LION SPECIALTY CHEMICALS CO., LTD.) was used. Properties of Ketjen Black EC600J are shown in Table 1.

As the carbon fibers, carbon fibers having an average fiber diameter of 6 μm and an average length of 3 mm were used.

As the binding polymer material, polyacrylonitrile (PAN) was used.

TABLE 1

| | Properties of porous carbon particles used herein | | | | | |
|---|---|---|---|---|---|---|
| Name | Volume of pores having diameter of 1 nm or more and 1,000 nm or less (BJH method) ($cm^3/g$) | Volume of pores having diameter of 1 nm or more and 200 nm or less (BJH method) ($cm^3/g$) | Volume of pores having diameter of 200 nm or more and 1,000 nm or less (BJH method) ($cm^3/g$) | BET specific surface area ($m^2/g$) | t-Plot external specific surface area ($m^2/g$) | t-Plot micropore specific surface area ($m^2/g$) |
| Ketjen Black EC600J | 3.6 | 1.6 | 1.0 | 1328 | 1130 | 198 |
| Black pearls | 3.2 | 2.8 | 0.4 | 1547 | 486 | 1061 |
| Vulcan XC72 | 1.0 | 0.8 | 0.2 | 227 | 117 | 110 |

The mixture slurry was molded into a sheet having a uniform thickness by means of a wet film forming method using a doctor blade (step S2 in FIG. 4). In this instance, three types of molded sheets each of which has a thickness of 300 μm, 500 μm, or 600 μm were produced.

After molding the mixture slurry, the molded samples were immersed in methanol (a poor solvent) by means of a non-solvent induced phase separation method to form porous films (step S3 in FIG. 4). The non-solvent induced phase separation method is a method in which a polymer solution is immersed in a non-solvent to phase-separate and precipitate a polymer. In Example 1A, the molded sheet in a state where the above Ketjen Black (registered trademark) as porous carbon particles and the above carbon fibers were dispersed in an N-methylpyrrolidone solution of polyacrylonitrile (PAN) as a binding polymer material was immersed in methanol as a non-solvent (poor solvent) to phase-separate and precipitate polyacrylonitrile (PAN) in a state of bonding the above Ketjen Black (registered trademark) with the above carbon fibers, thereby producing a porous film containing the above Ketjen Black (registered trademark) as a skeleton and also containing the above carbon fibers. In this instance, most of N-methylpyrrolidone is dissolved in methanol.

Next, a drying step (step S4 in FIG. 4) at 50 to 80° C. for 10 hours or more was performed to remove the volatile solvent from the sample, and subsequently an infusibilization heat treatment (step S5 in FIG. 4) was performed at 320° C. for 3 hours in the air.

Then, carbon structures each of which has a length of 90 mm and a width of 80 mm obtained by the infusibilization heat treatment were subjected, under ten conditions shown in Porous carbon structure Nos. 1 to 10 in Table 2, to a carbonization treatment (step S6 in FIG. 4) and an additional carbonization treatment, thereby obtaining ten types of porous carbon structures (step S7 in FIG. 4).

The carbonization treatment was performed using a box type furnace manufactured by DENKEN-HIGHDENTAL Co., Ltd., and the temperature rise speed was 10° C./min in all the following cases: a case of performing the carbonization treatment (oxidation treatment) in an oxidizing gas atmosphere; a case of performing the carbonization treatment in an inert gas atmosphere; and a case of performing the carbonization treatment in an oxidizing gas atmosphere, and subsequently in an inert gas atmosphere. The oxidizing gas was a mixed gas of oxygen and nitrogen. The inert gas was nitrogen gas.

The preparation (producing) conditions of each sample of Porous carbon structure Nos. 1 to 10 are summarized and shown in Table 2.

TABLE 2

Manufacturing conditions of each porous carbon structure

| Porous carbon structure No. | Used porous carbon particles | Used binding polymer | Composition of mixture (step of preparing mixture slurry) | | | Coating thickness μm | Used solvent (solvent immersion step) | Oxidation conditions | | Carbonization in nitrogen | | Yield in oxidation and carbonization (wt %) | Thickness of porous carbon structure (μm) | Self-supporting ability of porous carbon structure |
|---|---|---|---|---|---|---|---|---|---|---|---|---|---|---|
| | | | Porous carbon particles (parts by weight) | Binding polymer material (parts by weight) | Carbon fibers (parts by weight) | | | Oxygen concentration (%) | Temperature (° C.) | Temperature (° C.) | Holding time (hr) | | | |
| No.1 (Present invention) | Ketjen Black | PAN | 65 | 23 | 12 | 300 | Methanol | No oxidation | | 1050 | 3 | 82 | 150 | Yes |
| No.2 (Present invention) | Ketjen Black | PAN | 65 | 23 | 12 | 300 | Methanol | 0.25 | 450 | 1050 | 3 | 56 | 160 | Yes |
| No.3 (Present invention) | Ketjen Black | PAN | 65 | 23 | 12 | 300 | Methanol | 1.0 | 1050 | 1050 | 3 | 31 | 130 | Yes |
| No.4 (Present invention) | Ketjen Black | PAN | 65 | 23 | 12 | 500 | Methanol | No oxidation | | 1050 | 3 | 87 | 270 | Yes |
| No.5 (Present invention) | Ketjen Black | PAN | 65 | 23 | 12 | 500 | Methanol | 0.25 | 600 | 1050 | 3 | 57 | 260 | Yes |
| No.6 (Present invention) | Ketjen Black | PAN | 65 | 23 | 12 | 600 | Methanol | 0.5 | 630 | 1050 | 3 | 47 | 290 | Yes |
| No.7 (Present invention) | Ketjen Black | PAN | 65 | 23 | 12 | 600 | Methanol | 0.5 | 1050 | 1050 | 3 | 26 | 190 | Yes |
| No.8 (Present invention) | Ketjen Black | PAN | 65 | 23 | 12 | 600 | Methanol | 0.05 | 600 | 1050 | 3 | 61 | 320 | Yes |
| No.9 (Comparative example) | Ketjen Black | PAN | 65 | 23 | 12 | 600 | Methanol | 5 | 1050 | 1050 | 3 | 5 | Unmeasurable | Shape is not maintained |
| No.10 (Present invention) | Ketjen Black | PAN | 65 | 23 | 12 | 600 | Methanol | 0.33 | 1050 | 1050 | 3 | 36 | 250 | Yes |
| No.11 (Present invention) | Ketjen Black | PAN | 63 | 25 | 12 | 1000 | Water | No oxidation | | 1050 | 3 | 86 | 510 | Yes |
| No.12 (Present invention) | Ketjen Black | PAN | 63 | 25 | 12 | 1000 | Methanol | No oxidation | | 1050 | 3 | 88 | 470 | Yes |
| No.13 (Present invention) | Ketjen Black | PAN | 65 | 25 | 10 | 1000 | Ethanol | No oxidation | | 1050 | 3 | 86 | 542 | Yes |
| No.14 (Present invention) | Ketjen Black | PAN | 75 | 15 | 10 | 500 | Methanol | No oxidation | | 1050 | 3 | 87 | 220 | Yes |
| No.15 (Present invention) | Ketjen Black | PAN | 85 | 5 | 10 | 500 | Methanol | No oxidation | | 1050 | 3 | 94 | 245 | Yes |
| No.16 (Present invention) | Black pearls | PAN | 68 | 23 | 9 | 300 | Methanol | No oxidation | | 1050 | 3 | 87 | 170 | Yes |

TABLE 2-continued

Manufacturing conditions of each porous carbon structure

| Porous carbon structure No. | Composition of mixture (step of preparing mixture slurry) | | | | Coating thickness μm | Used solvent (solvent immersion step) | Oxidation conditions | | Carbonization in nitrogen | | Yeild in oxidation and carbonization (wt %) | Thickness of porous carbon structure (μm) | Self-supporting ability of porous carbon structure |
|---|---|---|---|---|---|---|---|---|---|---|---|---|---|
| | Used porous carbon particles | Used binding polymer | Porous carbon particles (parts by weight) | Binding polymer material (parts by weight) | Carbon fibers (parts by weight) | | | Oxygen concentration (%) | Temperature (° C.) | Temperature (° C.) | Holding time (hr) | | | |
| No.17 (Comparative example) | — | — | — | — | — | — | Methanol | No oxidation | | 1050 | 3 | — | 110 | Yes |
| No.18 (Comparative example) | — | — | — | — | — | — | Methanol | No oxidation | | 1050 | 3 | — | 283 | Yes |
| No.19 (Comparative example) | Ketjen Black | PAN | 20 | 70 | 10 | 500 | Methanol | No oxidation | | 1050 | 3 | 58 | 142 | Yes |
| No.20 (Comparative example) | Ketjen Black | PAN | 30 | 60 | 10 | 500 | Methanol | No oxidation | | 1050 | 3 | 65 | 170 | Yes |
| No.21 (Comparative example) | Vulcan XC72 | PAN | 68 | 23 | 9 | 300 | Methanol | No oxidation | | 1050 | 3 | 84 | 216 | Yes |
| No.22 (Comparative example) | Ketjen Black | PTFE | 65 | 35 | — | — | — | — | — | — | — | — | 354 | Yes |
| No.23 (Comparative example) | Ketjen Black | PTFE | 90 | 10 | — | — | — | — | — | — | — | — | Umeasurable | Shape is not maintained |
| No.24 (Comparative example) | Ketjen Black | PTFE | 90 | 10 | — | — | — | — | — | — | — | — | Umeasurable | Shape is not maintained |
| No.25 (Comparative example) | Ketjen Black | PTFE | 95 | 5 | — | — | — | — | — | — | — | — | Umeasurable | Shape is not maintained |

As for Porous carbon structure Nos. 1 and 4 in Table 2, only carbonization was performed while flowing nitrogen at 800 mL/min without performing the oxidation treatment. As for Porous carbon structure Nos. 2, 5, 6, and 8 in Table 2, carbonization was performed by the following: raising the temperature to the oxidation temperature shown in Table 2 while flowing a gas having an oxygen concentration shown in Table 2 at 800 mL/min; switching the gas to nitrogen at the temperature, subsequently raising the temperature to 1050° C. in nitrogen, and holding the sample for 3 hours; and then cooling the sample to room temperature. As for Porous carbon structure Nos. 3, 7, 9, and 10 in Table 2, carbonization was performed by the following: raising the temperature to 1050° C. of the oxidation temperature shown in Table 2 while flowing a gas having an oxygen concentration shown in Table 2 at 800 mL/min; holding the sample for 2 hours, subsequently switching the gas to nitrogen, and holding the sample for 1 hour; and then cooling the sample to room temperature.

(Properties of Porous Carbon Structures)

As for these samples (Porous carbon structure Nos. 1 to 10), the yield and thickness were measured, and the samples were observed for the self-supporting ability. The results are collectively shown in Table 2.

In addition, details of the sample of Porous carbon structure No. 5 were observed using a scanning electron microscope (SEM, manufactured by JEOL Ltd., JSM-7800F). The results of these observations are shown in FIGS. 8 and 9.

FIG. 8 is a SEM image of the sample of Porous carbon structure No. 5.

Figure 9:
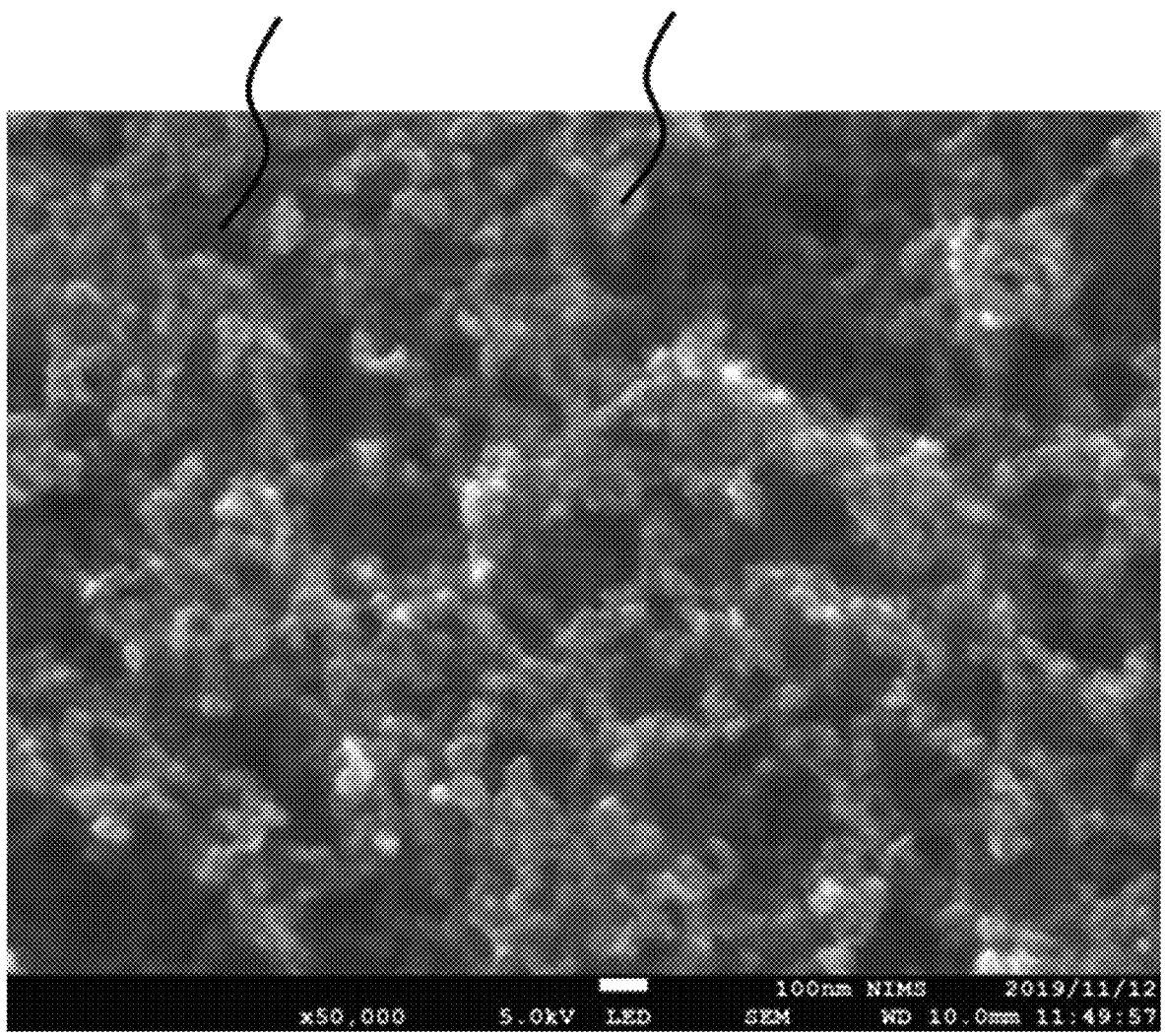
FIG. 9 is a high-magnification SEM image (magnification: 50,000) of porous carbon structure No. 5.

FIG. 9 is an enlarged view of the SEM image in FIG. 8.

According to FIGS. 8 and 9, it has been found that the method of the present invention (FIG. 4) provides a porous carbon structure having a skeleton 10 containing carbon and a large number of pores 11 and 12.

FIG. 8 shows the pores 12 corresponding to "pores having a diameter of 200 nm or more and 10,000 nm or less", and FIG. 9 shows the pores 11 corresponding to "pores having a diameter of 1 nm or more and 1,000 nm or less".

Properties of each sample of Porous carbon structure Nos. 1 to 10 were examined by the following methods (1) to (10), and the results are shown in Table 3.

(1) Pore volume of pores having diameter of 1 nm or more and 1,000 nm or less

The pore volume was determined by the BJH method from an adsorption isotherm obtained by the nitrogen adsorption method using 3Flex (manufactured by Micromeritics Instrument Corp.).

(2) Pore volume of pores having diameter of 1 nm or more and 200 nm or less

The pore volume was determined by the BJH method from an adsorption isotherm obtained by the nitrogen adsorption method using 3Flex (manufactured by Micromeritics Instrument Corp.).

(3) Pore volume of pores having diameter of 1 μm or more and 200 μm or less

The pore volume of pores having a diameter in the range of 10 nm to 200,000 nm (0.01 μm to 200 μm) was measured by means of the mercury intrusion method using AutoPore IV (manufactured by Micromeritics Instrument Corp.), and a value of the pore volume of pores having a pore diameter of 1 μm to 200 μm was used.

(4) BET specific surface area

The BET specific surface area was determined according to the BET method from an adsorption isotherm obtained by the nitrogen adsorption method using 3Flex (manufactured by Micromeritics Instrument Corp.).

(5) t-Plot external specific surface area

The t-plot external specific surface area was determined by the t-plot method from a graph of an adsorption isotherm, which was obtained by the nitrogen adsorption method using 3Flex (manufactured by Micromeritics Instrument Corp.), and in which the layer thickness of adsorbed nitrogen was plotted on the horizontal axis, and the amount of adsorbed nitrogen was plotted on the vertical axis.

(6) t-Plot micropore specific surface area

The t-plot micropore specific surface area is defined as a value obtained by subtracting the t-plot external specific surface area from the specific surface area determined by the BET method.

(7) Apparent density

The apparent density was determined by dividing the weight of the porous carbon structure by the volume of the porous carbon structure.

(8) Porosity (%)

The porosity was determined by the following calculation.

(1−apparent density of porous carbon structure/true density of constituent material of porous carbon structure)×100

(9) Pore volume of pores having diameter of 200 nm or more and 10,000 nm or less The pore volume of pores having a diameter in the range of 10 nm to 200,000 nm (0.01 μm to 200 μm) was measured by means of the mercury intrusion method using AutoPore IV (manufactured by Micromeritics Instrument Corp.), and a value of the pore volume of pores having a pore diameter of 200 nm to 10,000 nm was used.

(10) F content (%)

A sample was weighed, and burned in an argon/oxygen mixed gas in a combustion tube of an analyzer (AQF-2100H, GA-210 (manufactured by Mitsubishi Chemical Corporation) was used). A gas generated by the burning was made to be absorbed in an aqueous hydrogen peroxide solution, and then a part of the solution having absorbed the gas was analyzed using ion chromatography ICS-1600 manufactured by Dionex Corporation. The sample was weighed and measured (n=2 to 3), and the average of the measured values was determined to calculate the F content in the sample.

TABLE 3

Properties of each porous carbon structure

| | Volume of pores having diameter of 1 nm or more and 1,000 nm or less (BJH method) (cm³/g) | Volume of pores having diameter of 1 nm or more and 200 nm or less (BJH method) (cm³/g) | Volume of pores having diameter of 200 nm or more and 10,000 nm or less (mercury intrusion method) (cm³/g) | Volume of pores having diameter of 1 μm or more and 200 μm or less (mercury intrusion method) (cm³/g) | BET specific surface area (m²/g) | t-Plot external specific surface area (m²/g) | t-Plot micropore specific surface area (m²/g) | Apparent density (g/cm³) | Porosity (%) | SA ratio (t-Plot external specific surface area/BET specific surface area × 100) (%) | F content (mass %) |
|---|---|---|---|---|---|---|---|---|---|---|---|
| No.1 (Present invention) | 3.3 | 2.1 | 1.7 | 3.4 | 808 | 773 | 35 | 0.18 | 91.6 | 96 | 0.0002 or less |
| No.2 (Present invention) | 5.0 | 3.1 | 3.3 | 7.0 | 1,080 | 1,036 | 44 | 0.14 | 93.6 | 96 | 0.0002 or less |
| No.3 (Present invention) | 5.9 | 4.1 | 4.4 | 12.8 | 1,056 | 1,044 | 12 | 0.11 | 94.9 | 99 | 0.0002 or less |
| No.4 (Present invention) | 3.1 | 2.0 | 1.4 | 3.1 | 756 | 727 | 29 | 0.19 | 91.3 | 96 | 0.0002 or less |
| No.5 (Present invention) | 4.9 | 3.4 | 3.2 | 5.0 | 1,143 | 1,101 | 42 | 0.13 | 94.1 | 96 | 0.0002 or less |
| No.6 (Present invention) | 5.1 | 3.4 | 3.6 | 5.6 | 1,135 | 1,117 | 18 | 0.12 | 94.5 | 98 | 0.0002 or less |
| No.7 (Present invention) | 6.0 | 4.5 | 4.5 | 5.8 | 1,204 | 1,193 | 11 | 0.11 | 95.0 | 99 | 0.0002 or less |
| No.8 (Present invention) | 4.7 | 2.7 | 3.1 | 1.8 | 1,057 | 996 | 61 | 0.15 | 93.0 | 94 | 0.0002 or less |
| No.9 (Comparative example) | 2.2 | 1.1 | 1.3 | 10.1 | 229 | 93 | 136 | Umeasurable | Umeasurable | 41 | 0.0002 or less |
| No.10 (Present invention) | 5.6 | 3.5 | 4.2 | 1.8 | 1,192 | 1,172 | 20 | 0.11 | 95.1 | 98 | 0.0002 or less |
| No.11 (Present invention) | 2.4 | 1.4 | 0.8 | 1.2 | 646 | 540 | 106 | 0.21 | 89.9 | 84 | 0.0002 or less |
| No.12 (Present invention) | 2.3 | 1.5 | 0.9 | 1.3 | 646 | 533 | 113 | 0.17 | 90.0 | 83 | 0.0002 or less |
| No.13 (Present invention) | 2.3 | 1.5 | 1.0 | 1.4 | 709 | 567 | 142 | 0 17 | 91.0 | 80 | 0.0002 or less |
| No.14 (Present invention) | 4.0 | 2.4 | 1.7 | 0.8 | 931 | 898 | 33 | 0.17 | 92.9 | 96 | 0.0002 or less |
| No.15 (Present invention) | 4.0 | 3.0 | 2.7 | 2.9 | 1,111 | 1,072 | 39 | 0.16 | 93.0 | 96 | 0.0002 or less |

TABLE 3-continued

Properties of each porous carbon structure

| | Volume of pores having diameter of 1 nm or more and 1,000 nm or less (BJH method) (cm³/g) | Volume of pores having diameter of 1 nm or more and 200 nm or less (BJH method) (cm³/g) | Volume of pores having diameter of 200 nm or more and 10,000 nm or less (mercury intrusion method) (cm³/g) | Volume of pores having diameter of 1 μm or more and 200 μm or less (mercury intrusion method) (cm³/g) | BET specific surface area (m²/g) | t-Plot external specific surface area (m²/g) | t-Plot micropore specific surface area (m²/g) | Apparent density (g/cm³) | Porosity (%) | SA ratio (t-Plot external specific surface area/BET specific surface area × 100) (%) | F content (mass %) |
|---|---|---|---|---|---|---|---|---|---|---|---|
| No.16 (Present invention) | 2.8 | 2.3 | 0.1 | 0.2 | 930 | 320 | 610 | 0.25 | 88.0 | 31 | 0.0002 or less |
| No.17 (Comparative example) | 0.1 | 0.0 | 0.1 | 2.8 | 80 | 80 | 0 | 0.42 | 78.0 | 100 | 0.0002 or less |
| No.18 (Comparative example) | 0.7 | 0.7 | 0.5 | 2.9 | 1,994 | 114 | 1,880 | 0.28 | 84.7 | 6 | 0.0002 or less |
| No.19 (Comparative example) | 0.5 | 0.3 | 0.3 | 0.0 | 34 | 22 | 12 | 0.20 | 91.4 | 65 | 0.0002 or less |
| No.20 (Comparative example) | 0.9 | 0.5 | 0.9 | 0.5 | 79 | 39 | 40 | 0.22 | 90.1 | 49 | 0.0002 or less |
| No.21 (Comparative example) | 0.6 | 0.3 | 1.0 | 0.3 | 153 | 66 | 87 | 0.33 | 85.0 | 43 | 0.0002 or less |
| No.22 (Comparative example) | 1.2 | 1.0 | 0.8 | 1.5 | 1,434 | 291 | 1,142 | 0.36 | 81.0 | 20 | 18.6 |
| No.23 (Comparative example) | — | — | — | — | — | — | — | — | — | — | 8.5 |
| No.24 (Comparative example) | — | — | — | — | — | — | — | — | — | — | 4.1 |
| No.25 (Comparative example) | — | — | — | — | — | — | — | — | — | — | 4 1 |

As shown in Table 3, it has been found that all the samples of Porous carbon structure Nos. 1 to 8 and 10 have a t-plot external specific surface area in the range of 300 m²/g or more and 1,600 m²/g or less, a pore volume of pores having a diameter of 1 nm or more and 200 nm or less in the range of 1.2 cm³/g or more and 7.0 cm³/g or less, a pore volume of pores having a diameter of 1 nm or more and 1,000 nm or less in the range of 2.3 cm³/g or more and 10.0 cm³/g or less, and an overall porosity in the range of 80% or more and 99% or less, and satisfy all of the above-mentioned conditions (a) to (d).

In contrast, it has been found that the sample of Porous carbon structure No. 9 satisfies not all of the above-mentioned conditions (a) to (d).

As shown in Table 3, it has also been confirmed that the samples of Porous carbon structure Nos. 2, 3, 5 to 8, and 10 further satisfy a pore volume of pores having a diameter of 200 nm or more and 10,000 nm or less of 2.3 cm³/g or more and 8.0 cm³/g or less, which is in the range of 2.3 cm³/g or more and 10.0 cm³/g or less, a pore volume of pores having a diameter of 1 nm or more and 200 nm or less of 2.2 cm³/g or more and 7.0 cm³/g or less, which is in the range of 1.2 cm³/g or more and 7.0 cm³/g or less, an apparent density of the porous carbon structure in the range of 0.05 g/cm³ or more and 0.20 g/cm³ or less, and an overall porosity in the range of 90% or more and 99% or less, which is in the range of 80% or more and 99% or less.

Furthermore, it has also been confirmed that all the samples of Porous carbon structure Nos. 1 to 8 and 10 have a fluorine (F) content in the porous carbon structure of 0.0002 mass % or less.

In the samples of Porous carbon structure Nos. 2, 3, 5 to 8, and 10, the pore volume of pores having a diameter of 200 nm or more and 10,000 nm or less is in the range of 2.3 cm³/g or more and 8.0 cm³/g or less, and it has been found that the above samples also satisfy the above-mentioned condition (e).

Furthermore, it has been found that in all the samples of Porous carbon structure Nos. 2, 3, 5 to 8, and 10, a pore volume of pores having a diameter of 1 nm or more and 1,000 nm or less satisfies the range of 4.1 cm³/g or more and 9.0 cm³/g or less, which is in the range of 4.0 cm³/g or more and 10.0 cm³/g or less, and a pore volume of pores having a diameter of 1 nm or more and 200 nm or less satisfies the range of 2.4 cm³/g or more and 6.0 cm³/g, which is in the range of 2.2 cm³/g or more and 7.0 cm³/g or less. It has also been found that the pore volumes were larger than those values of Ketjen Black (registered trademark) as a raw material shown in Table 1. In particular, focusing on the pore volume of pores having a diameter of 1 nm or more and 1,000 nm or less, it has been found that the pore volume in each sample of Porous carbon structure Nos. 2, 3, 5 to 8, and 10 was 1.02 times or more the pore volume in Ketjen Black (registered trademark), and it has been confirmed that the carbonization treatment step was sufficiently performed.

This matter can be explained by the following facts: PAN (polyacrylonitrile) of a binder having been covering the particle surface of Ketjen Black (registered trademark) and a carbonized product of PAN were mostly burned off by the oxidation treatment, so that the surface of Ketjen Black (registered trademark) was able to be exposed; and further a part of the particle surface of Ketjen Black (registered trademark) was oxidized and burned off. In addition, PAN existing at the portion binding Ketjen Black (registered trademark) particles to each other is not burned off due to difficulty of entry of oxygen, and thus remains as carbonized, thereby securing the self-supporting ability and strength of the porous carbon structure.

In contrast, it is understood that in the sample of Porous carbon structure No. 9 oxidized with 5% of oxygen, the amount of Ketjen Black (registered trademark) particles which were oxidized and burned off due to high concentration of oxygen increases more, and as a result, a larger amount of PAN existing at the portion binding the particles to each other was burned off, and the strength of the porous carbon structure was reduced. That is, it is understood that as for the sample of Porous carbon structure No. 9, since the carbonization treatment performed in the samples of Porous carbon structure Nos. 1 to 8 and 10 of the present invention was not performed, the self-supporting ability of the porous carbon structure was not obtained.

Meanwhile, in each sample of Porous carbon structure Nos. 1 and 4 obtained by carbonization only with nitrogen, the pore volume of pores having a diameter of 1 nm or more and 1,000 nm or less and the pore volume of pores having a diameter of 1 nm or more and 200 nm or less became to be smaller than those of Ketjen Black (registered trademark) as a raw material. This is because the carbonized product derived from PAN covers the surfaces of Ketjen Black (registered trademark) particles.

It has been confirmed that the samples of Porous carbon structure Nos. 2, 3, 5 to 8, and 10 satisfy a t-plot external specific surface area in the range of 900 $m^2/g$ or more and 1,600 $m^2/g$ or less within the range of 300 $m^2/g$ or more and 1,600 $m^2/g$ or less.

Example 2A: Coin Cell (Lithium-Air Battery)

In Example 2A, a CR2032 type coin cell 601 (FIG. 6) was produced using each sample of Porous carbon structure Nos. 1 to 8 and 10 of the present invention manufactured (produced) in Example 1A for a positive electrode structure 690 (FIG. 6), and battery characteristics of the coin cell were evaluated.

The sample of Porous carbon structure No. 9 subjected to an oxidation treatment at an oxygen concentration of 5% up to 1050° C. was not subjected to battery evaluation as a positive electrode. This is because the sample of Porous carbon structure No. 9 was not in a state capable of performing the battery evaluation due to its low strength and brittleness.

A coin cell was manufactured as follows. In a dry room (in dry air) having a dew point temperature of −50° C. or less, a positive electrode structure obtained by cutting each of Porous carbon structure Nos. 1 to 8 and 10 into a piece having a diameter (Φ) of 16 mm, metal lithium (which has a diameter (Φ) of 16 mm and a thickness of 0.2 mm) as a negative electrode structure, and glass fiber paper (Whatman (registered trademark), GF/A) as a separator, which was immersed in the 1 M-tetraethylene glycol dimethyl ether solution of LiTFS (lithium trifluoromethanesulfonate) as an electrolytic solution, were packaged in a coin cell case (CR2032 type).

The battery characteristics of each coin cell (lithium-air battery) obtained in such a method were evaluated under a pure oxygen atmosphere.

As conditions of the battery evaluation, discharge was also performed under the conditions of high-speed current densities of 0.6 $mA/cm^2$ and 0.8 $mA/cm^2$ in addition to the condition of a current density of 0.4 $mA/cm^2$, and the discharge capacity per weight of the positive electrode was calculated by dividing the obtained discharge capacity by the weight of the porous carbon structure used as the positive electrode by taking the time point when the voltage decreased to 2.3 V as the discharge end point.

For the measurement, a charge/discharge tester (HJ1001SD8 manufactured by HOKUTO DENKO CORPORATION) was used. The results are shown in Table 4.

TABLE 4

Discharge capacities of air batteries using each porous carbon structure as positive electrode

| Porous carbon structure No. used in positive electrode | Discharge capacity at 0.4 $mA/cm^2$ (mAh/g) | Discharge capacity at 0.6 $mA/cm^2$ (mAh/g) | discharge capacity at 0.8 $mA/cm^2$ (mAh/g) |
|---|---|---|---|
| No. 1 (Present invention) | 2,824 | 2,588 | 1,700 |
| No. 2 (Present invention) | 4,024 | 3,888 | 3,558 |
| No. 3 (Present invention) | 7,148 | 6,441 | 5,838 |
| No. 4 (Present invention) | 2,488 | 1,701 | 1,617 |
| No. 5 (Present invention) | 4.813 | 3,681 | 3.370 |
| No. 6 (Present invention) | 5,646 | 3,884 | 3,161 |
| No. 7 (Present invention) | 4,243 | 4,900 | 4,579 |
| No. 8 (Present invention) | 3,063 | 2,854 | 2,203 |
| No. 10 (Present invention) | 3.770 | 3.688 | 3.229 |
| No. 11 (Present invention) | 1,628 | — | 916 |
| No. 12 (Present invention) | 1,980 | — | 1,369 |
| No. 13 (Present invention) | 1.971 | — | 1,370 |
| No. 14 (Present invention) | 3,162 | 2,666 | 1,823 |
| No. 15 (Present invention) | 4,975 | 5,063 | 4,838 |
| No. 16 (Present invention) | 3,070 | 2,656 | 2,382 |
| No. 17 (Comparative example) | 285 | — | — |
| No. 18 (Comparative example) | 290 | — | — |
| No. 19 (Comparative example) | 459 | 906 | 889 |
| No. 20 (Comparative example) | 693 | 1,644 | 382 |
| No. 21 (Comparative example) | 1,330 | 1,089 | 880 |
| No. 22 (Comparative example) | 740 | — | — |

According to the results in Tables 2 and 4, it has been shown that all the samples of Porous carbon structure Nos. 1 to 8 and 10 of the present invention, which satisfy all of the above-mentioned conditions (a) to (d), can be used as a self-supportable positive electrode structure in an air battery, unlike the comparative sample (comparative example) of Porous carbon structure No. 9 which satisfies not all of the conditions, and that the porous carbon structures can alone serve as a positive electrode material for an air battery without using a current collector such as a metal mesh. It has also been found that the samples as a whole exhibit much higher discharge capacity values than in the case where the comparative samples (comparative examples) of Porous carbon structure Nos. 17 to 22 described below are used as the positive electrode structure.

Furthermore, according to Table 4, it has been found that coin cells using, as a positive electrode structure, each sample of Porous carbon structure Nos. 2, 3, 5 to 8, and 10 of the present invention obtained by an oxidation treatment in an oxidizing gas atmosphere as the carbonization treatment in the carbonization treatment step (step S4) not only exhibit a higher discharge capacity in discharge at a current density of 0.4 mA/cm$^2$ but also exhibit a higher discharge capacity in discharge at high-speed current densities of 0.6 mA/cm$^2$ and 0.8 mA/cm$^2$, compared with coin cells using, as a positive electrode structure, each sample of Porous carbon structure Nos. 1 and 4 of the present invention obtained by carbonization only with nitrogen gas without being subjected to the oxidation treatment.

Example 1B: Porous Carbon Structure

In Example 1B, the preparation of porous carbon structure samples of the present invention (Porous carbon structure Nos. 11 to 16) and comparative samples (Porous carbon structure Nos. 17 to 25), and properties of the produced porous carbon structure samples and the comparative samples are described.

(Preparation of Sample of Porous Carbon Structure No. 11 of the Present Invention)

First, a mixture slurry was prepared using the following: 65 wt % of porous carbon particles; 10 wt % of carbon fibers; 25 wt % of a binding polymer material; and a solvent containing N-methylpyrrolidone to uniformly disperse the above-mentioned components (step S1 in FIG. 4).

Here, as the porous carbon particles, carbon black containing 65 wt % of Ketjen Black (registered trademark) was used.

As the carbon fibers, carbon fibers having an average fiber diameter of 7 μm and an average length of 3 mm were used. As the binding polymer material, polyacrylonitrile (PAN) was used.

The mixture slurry was molded into a sheet having a uniform thickness by means of a wet film forming method using a doctor blade (step S2 in FIG. 4). After molding the mixture slurry, the molded sample was immersed in water (a poor solvent) by means of a non-solvent induced phase separation method to form the molded sample into a porous film.

Next, a drying step (step S4 in FIG. 4) at 50 to 80° C. for 10 hours or more was performed to remove the volatile solvent from the sample, and subsequently an infusibilization heat treatment (step S5 in FIG. 4) was performed at 280° C. for 3 hours in the air. Then, as the carbonization treatment step (step S6 in FIG. 4), firing was performed at 1000° C. for 3 hours in a firing furnace under a nitrogen gas atmosphere after vacuum replacement to produce a porous carbon structure sample having a length of 140 mm, a width of 100 mm, and a thickness of 510 μm (step S7 in FIG. 4).

The producing (manufacturing) conditions of the sample of Porous carbon structure No. 11 of the present invention are as shown in Table 2.

(Properties of Sample of Porous Carbon Structure No. 11 of the Present Invention)

The characteristics of the sample of Porous carbon structure No. 11 produced by the above-mentioned steps were examined in the same manner as the measurements of the properties of each sample of Porous carbon structure Nos. 1 to 10, and the results are shown in Table 3.

Specifically, the sample had a thickness of 510 μm as shown in Table 2, a basis weight of 10.8 mg/cm$^2$, a BET specific surface area of 646 m$^2$/g as shown in Table 3, a t-plot external specific surface area of 540 m$^2$/g as shown in Table 3, and a total t-plot external specific surface area ratio (SA ratio) of 84% as shown in Table 3. The sample had a porosity of 89.9% as shown in Table 3.

Figure 10:
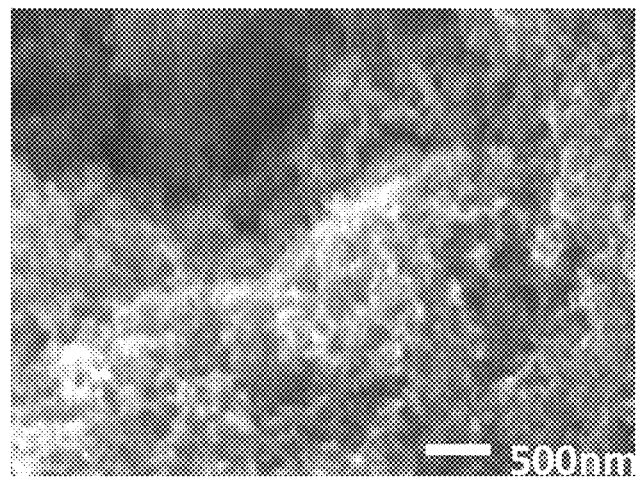
FIG. 10 is a SEM image of a produced porous carbon structure (a sample of porous carbon structure No. 11).

A secondary scanning electron microscope image of the obtained porous carbon structure is shown in FIG. 10. Although the porous carbon structure had a spongelike structure with pores, it exhibited self-supporting strength.

As shown in Table 3, it has been confirmed that the sample of Porous carbon structure No. 11 has a t-plot external specific surface area of 540 m$^2$/g within the range of 300 m$^2$/g or more and 1,600 m$^2$/g or less (the above-mentioned condition (a)), a pore volume of pores having a diameter of 1 nm or more and 200 nm or less of 1.4 cm$^3$/g within the range of 1.2 cm$^3$/g or more and 7.0 cm$^3$/g or less (the above-mentioned condition (b)), a pore volume of pores having a diameter of 1 nm or more and 1,000 nm or less of 2.4 cm$^3$/g within the range of 2.3 cm$^3$/g or more and 10.0 cm$^3$/g or less (the above-mentioned condition (c)), and an overall porosity of 89.9% within the range of 80% or more and 99% or less (the above-mentioned condition (d)), and satisfies all of the above-mentioned conditions (a) to (d).

(Preparation of Sample of Porous Carbon Structure No. 12 of the Present Invention)

The sample of Porous carbon structure No. 12 was produced in the same manner as the preparation of Porous carbon structure No. 11 except that methanol was used as a poor solvent in the non-solvent induced phase separation method. The specific producing (manufacturing) conditions are as shown in Table 2.

(Properties of Sample of Porous Carbon Structure No. 12 of the Present Invention)

The characteristics of the sample of Porous carbon structure No. 12 produced by the above-mentioned steps were examined in the same manner as the measurements of the properties of each sample of Porous carbon structure Nos. 1 to 10, and the results are shown in Table 3.

Specifically, the sample had a thickness of 470 μm as shown in Table 2, a basis weight of 7.9 mg/cm$^2$, a BET specific surface area of 646 m$^2$/g as shown in Table 3, a t-plot external specific surface area of 533 m$^2$/g as shown in Table 3, and a total t-plot external specific surface area ratio (SA ratio) of 83% as shown in Table 3. Also, the sample had a porosity of 90% as shown in Table 3.

As shown in Table 3, it has been confirmed that the sample of Porous carbon structure No. 12 has a t-plot external specific surface area of 533 m$^2$/g which satisfies the above-mentioned condition (a), a pore volume of pores having a diameter of 1 nm or more and 200 nm or less of 1.5 cm$^3$/g which satisfies the above-mentioned condition (b), a pore volume of pores having a diameter of 1 nm or more and 1,000 nm or less of 2.3 cm$^3$/g which satisfies the above-mentioned condition (c), and an overall porosity of 90.0% which satisfies the above-mentioned condition (d), and thus satisfies all of the above-mentioned conditions (a) to (d).
(Preparation of Sample of Porous Carbon Structure No. 13 of the Present Invention)

The sample of Porous carbon structure No. 13 was produced in the same manner as the preparation of the sample of Porous carbon structure No. 11 except that ethanol was used as a poor solvent in the non-solvent induced phase separation method. The specific producing (manufacturing) conditions are as shown in Table 2.
(Properties of Sample of Porous Carbon Structure No. 13 of the Present Invention) The characteristics of the sample of Porous carbon structure No. 13 produced by the above-mentioned steps were examined in the same manner as the measurements of the properties of each sample of Porous carbon structure Nos. 1 to 10, and the results are shown in Table 3.

Specifically, the sample had a thickness of 542 μm as shown in Table 2, a basis weight of 9.4 mg/cm$^2$, a BET specific surface area of 709 m$^2$/g as shown in Table 3, a t-plot external specific surface area of 567 m$^2$/g as shown in Table 3, and a total t-plot external specific surface area ratio (SA ratio) of 80% as shown in Table 3. The sample had a porosity of 91% as shown in Table 3.

As shown in Table 3, it has been confirmed that the sample of Porous carbon structure No. 13 has a t-plot external specific surface area of 567 m$^2$/g which satisfies the above-mentioned condition (a), a pore volume of pores having a diameter of 1 nm or more and 200 nm or less of 1.5 cm$^3$/g which satisfies the above-mentioned condition (b), a pore volume of pores having a diameter of 1 nm or more and 1,000 nm or less of 2.3 cm$^3$/g which satisfies the above-mentioned condition (c), and an overall porosity of 91.0% which satisfies the above-mentioned condition (d), and thus satisfies all of the above-mentioned conditions (a) to (d).
(Preparation of Each Sample of Porous Carbon Structure Nos. 14 and 15 of the Present Invention)

Each sample of Porous carbon structure Nos. 14 and 15 was produced in the same manner as the preparation of the sample of Porous carbon structure No. 11 except for the following: as for the sample of Porous carbon structure No. 14, a mixture slurry having a composition (mixture composition) of 70 wt % of Ketjen Black, 10 wt % of carbon fibers, and 20 wt % of PAN was prepared and used; and as for the sample of Porous carbon structure No. 15, a mixture slurry having a composition (mixture composition) of 85 wt % of Ketjen Black, 10 wt % of carbon fibers, and 5 wt % of PAN was prepared and used. The specific producing (manufacturing) conditions are as shown in Table 2.
(Properties of Each Sample of Porous Carbon Structure Nos. 14 and 15 of the Present Invention)

The characteristics of each sample of Porous carbon structure Nos. 14 and 15 produced by the above-mentioned steps were examined in the same manner as the measurements of the properties of each sample of Porous carbon structure Nos. 1 to 10, and the results are shown in Table 3.

Specifically, as for Porous carbon structure No. 14, the sample had a thickness of 220 μm as shown in Table 2, a basis weight of 3.7 mg/cm$^2$, a BET specific surface area of 931 m$^2$/g as shown in Table 3, a t-plot external specific surface area of 898 m$^2$/g as shown in Table 3, and a total t-plot external specific surface area ratio (SA ratio) of 96% as shown in Table 3. Also, the sample had a porosity of 93% as shown in Table 3.

As for Porous carbon structure No. 15, the sample had a thickness of 245 μm as shown in Table 2, a basis weight of 4.0 mg/cm$^2$, a BET specific surface area of 1,111 m$^2$/g as shown in Table 3, a t-plot external specific surface area of 1,072 m$^2$/g as shown in Table 3, and a total t-plot external specific surface area ratio (SA ratio) of 96% as shown in Table 3. Also, the sample had a porosity of 93% as shown in Table 3.

As shown in Table 3, it has been confirmed that the sample of Porous carbon structure No. 14 has a t-plot external specific surface area of 898 m$^2$/g which satisfies the above-mentioned condition (a), a pore volume of pores having a diameter of 1 nm or more and 200 nm or less of 2.4 cm$^3$/g which satisfies the above-mentioned condition (b), a pore volume of pores having a diameter of 1 nm or more and 1,000 nm or less of 4.0 cm$^3$/g which satisfies the above-mentioned condition (c), and an overall porosity of 92.9% which satisfies the above-mentioned condition (d), and thus satisfies all of the above-mentioned conditions (a) to (d).

In addition, as shown in Table 3, it has been confirmed that the sample of Porous carbon structure No. 15 has a t-plot external specific surface area of 1,072 m$^2$/g which satisfies the above-mentioned condition (a), a pore volume of pores having a diameter of 1 nm or more and 200 nm or less of 3.0 cm$^3$/g which satisfies the above-mentioned condition (b), a pore volume of pores having a diameter of 1 nm or more and 1,000 nm or less of 4.0 cm$^3$/g which satisfies the above-mentioned condition (c), and an overall porosity of 93.0% which satisfies the above-mentioned condition (d), and thus satisfies all of the above-mentioned conditions (a) to (d).
(Preparation of Sample of Porous Carbon Structure No. 16 of the Present Invention)

The sample of Porous carbon structure No. 16 was produced in the same manner as the preparation of the sample of Porous carbon structure No. 11 except for the following: BLACK PEARLS (registered trademark) 2000 (manufactured by Cabot Corporation) was used as porous carbon particles; and a mixture slurry having a composition (mixture composition) of 68 wt % of BLACK PEARLS (registered trademark), 9 wt % of carbon fibers, and 23 wt % of PAN was prepared and used. The specific producing (manufacturing) conditions are as shown in Table 2.
(Properties of Sample of Porous Carbon Structure No. 16 of the Present Invention)

The characteristics of the sample of Porous carbon structure No. 16 produced by the above-mentioned steps were examined in the same manner as the measurements of the properties of each sample of Porous carbon structure Nos. 1 to 10, and the results are shown in Table 3.

Specifically, as for Porous carbon structure No. 16, the sample had a thickness of 170 μm as shown in Table 2, a basis weight of 4.3 mg/cm$^2$, a BET specific surface area of 930 m$^2$/g as shown in Table 3, a t-plot external specific surface area of 320 m$^2$/g as shown in Table 3, and a total t-plot external specific surface area ratio (SA ratio) of 34% as shown in Table 3. Also, the sample had a porosity of 88% as shown in Table 3.

As shown in Table 3, it has been confirmed that the sample of Porous carbon structure No. 16 has a t-plot external specific surface area of 320 m$^2$/g which satisfies the above-mentioned condition (a), a pore volume of pores having a diameter of 1 nm or more and 200 nm or less of 2.3 cm$^3$/g which satisfies the above-mentioned condition (b), a pore volume of pores having a diameter of 1 nm or more and 1,000 nm or less of 2.8 cm$^3$/g which satisfies the above-mentioned condition (c), and an overall porosity of 88.0% which satisfies the above-mentioned condition (d), and thus satisfies all of the above-mentioned conditions (a) to (d).

(Preparation of Sample of Porous Carbon Structure No. 17 as Comparative Sample)

The sample of Porous carbon structure No. 17 was produced in the same manner as the preparation of the sample of Porous carbon structure No. 11 except that a gas diffusion layer sheet (TGP-H-060 manufactured by Toray Industries, Inc.) made of carbon fibers was used as a sheet obtained by molding a mixture slurry into a sheet having a uniform thickness by means of a wet film forming method using a doctor blade. The specific producing (manufacturing) conditions are as shown in Table 2.

(Properties of Sample of Porous Carbon Structure No. 17 as Comparative Sample)

The characteristics of the sample of Porous carbon structure No. 17 produced by the above-mentioned steps were examined in the same manner as the measurements of the properties of each sample of Porous carbon structure Nos. 1 to 10, and the results are shown in Table 3.

Specifically, the sample had a thickness of 190 μm as shown in Table 2, a basis weight of 8.1 mg/cm$^2$, a small BET specific surface area of 80 m$^2$/g as shown in Table 3, and a small a t-plot external specific surface area of 80 m$^2$/g as shown in Table 3. Also, the sample had a low porosity of 78% as shown in Table 3.

As shown in Table 3, it has been confirmed that the sample of Porous carbon structure No. 17 satisfies none of the above-mentioned conditions (a) to (d), and thus satisfies not all of the above-mentioned conditions (a) to (d).

(Preparation of Sample of Porous Carbon Structure No. 18 as Comparative Sample)

The sample of Porous carbon structure No. 18 was produced in the same manner as the preparation of the sample of Porous carbon structure No. 11 except that an activated carbon fiber woven fabric (CL1420 manufactured by FUTAMURA CHEMICAL CO., LTD.) was used as a sheet obtained by molding a mixture slurry into a sheet having a uniform thickness by means of a wet film forming method using a doctor blade. The specific producing (manufacturing) conditions are as shown in Table 2.

(Properties of Sample of Porous Carbon Structure No. 18 as Comparative Sample)

The characteristics of the sample of Porous carbon structure No. 18 were examined in the same manner as the measurements of the properties of each sample of Porous carbon structure Nos. 1 to 10, and the results are shown in Table 3.

The sample had a thickness of 283 μm as shown in Table 2, a basis weight of 7.9 mg/cm$^2$, a large BET specific surface area of 1,994 m$^2$/g as shown in Table 3, a small t-plot external specific surface area of 114 m$^2$/g as shown in Table 3, and a low total t-plot external specific surface area ratio (SA ratio) of 5.7% as shown in Table 3.

As shown in Table 3, it has been confirmed that the sample of Porous carbon structure No. 18 satisfies not all of the above-mentioned conditions (a) to (d).

(Preparation of Samples of Porous Carbon Structure Nos. 19 and 20 as Comparative Samples)

Each sample of Porous carbon structure Nos. 19 and 20 was produced in the same manner as the preparation of Porous carbon structure No. 11 except for the following: as for the sample of Porous carbon structure No. 19, a mixture slurry having a composition (mixture composition) of 20 wt % of Ketjen Black, 10 wt % of carbon fibers, and 70 wt % of PAN was prepared and used; and as for the sample of Porous carbon structure No. 20, a mixture slurry having a composition (mixture composition) of 30 wt % of Ketjen Black, 10 wt % of carbon fibers, and 60 wt % of PAN were prepared and used. The specific producing (manufacturing) conditions are as shown in Table 2.

(Properties of Each Sample of Porous Carbon Structure Nos. 19 and 20 as Comparative Samples)

The characteristics of each sample of Porous carbon structure Nos. 19 and 20 produced by the above-mentioned steps were examined in the same manner as the measurements of the properties of each sample of Porous carbon structure Nos. 1 to 10, and the results are shown in Table 3.

Specifically, as for Porous carbon structure No. 19, the sample had a thickness of 142 μm as shown in Table 2, a basis weight of 2.8 mg/cm$^2$, a BET specific surface area of 34 m$^2$/g as shown in Table 3, a t-plot external specific surface area of 22 m$^2$/g as shown in Table 3, and a total t-plot external specific surface area ratio (SA ratio) of 65% as shown in Table 3. Also, the sample had a porosity of 91.4% as shown in Table 3. Thus, the sample had a small BET specific surface area and a small t-plot external specific surface area.

As for Porous carbon structure No. 20, the sample had a thickness of 170 μm as shown in Table 2, a basis weight of 3.8 mg/cm$^2$, a BET specific surface area of 79 m$^2$/g as shown in Table 3, a t-plot external specific surface area of 39 m$^2$/g as shown in Table 3, and a total t-plot external specific surface area ratio (SA ratio) of 49% as shown in Table 3. Also, the sample had a porosity of 90.1% as shown in Table 3.

As described above, each of Porous carbon structure Nos. 19 and 20 had a small BET specific surface area and a small t-plot external specific surface area.

As shown in Table 3, it has been confirmed that both the samples of Porous carbon structure Nos. 19 and 20 satisfy not all of the above-mentioned conditions (a) to (d).

(Preparation of Sample of Porous Carbon Structure No. 21 as Comparative Sample)

The sample of Porous carbon structure No. 21 was produced in the same manner as the preparation of Porous carbon structure No. 11 except for the following: VULCAN (registered trademark) XC-72 (manufactured by Cabot Corporation) was used as porous carbon particles; and a mixture slurry having a composition (mixture composition) of 68 wt % of VULCAN (registered trademark) XC-72, 9 wt % of carbon fibers, and 23 wt % of PAN was prepared and used. The specific producing (manufacturing) conditions are as shown in Table 2.

(Properties of Sample of Porous Carbon Structure No. 21 as Comparative Sample)

The characteristics of the sample of Porous carbon structure No. 21 produced by the above-mentioned steps were examined in the same manner as the measurements of the properties of each sample of Porous carbon structure Nos. 1 to 10, and the results are shown in Table 3.

Specifically, as for Porous carbon structure No. 21, the sample had a thickness of 216 μm as shown in Table 2, a basis weight of 7.1 mg/cm$^2$, a BET specific surface area of 153 m$^2$/g as shown in Table 3, a t-plot external specific surface area of 66 m$^2$/g as shown in Table 3, and a total t-plot external specific surface area ratio (SA ratio) of 43% as shown in Table 3. Also, the sample had a porosity of 85% as shown in Table 3.

As shown in Table 3, it has been confirmed that the sample of Porous carbon structure No. 21 satisfies not all of the above-mentioned conditions (a) to (d).

(Preparation of Sample of Porous Carbon Structure No. 22 as Comparative Sample)

As for the sample of Porous carbon structure No. 22, as a composition (mixture composition) of a mixture slurry prepared therein, 65 wt % of Ketjen Black (registered trademark) and 35 wt % of PTFE (manufactured by DAIKIN INDUSTRIES, LTD.) as a binder were used, and the solution of the mixture slurry was prepared by dispersing the above components in a water solvent. Here, PTFE means polytetrafluoroethylene.

Next, an activated carbon fiber woven fabric (CL1420 manufactured by FUTAMURA CHEMICAL CO., LTD.) was used as a supporting material, and on this base film, the above-mentioned water-dispersed mixture slurry was molded into a sheet having a uniform thickness by means of a wet film forming method using a doctor blade, thereby producing a sheet integrated with the activated carbon fiber supporting material.

Next, the volatile solvent was removed from the produced sheet, and the sheet was dried to produce a porous carbon film integrated with the activated carbon fiber woven fabric. The product was used as a porous carbon structure.

The specific producing (manufacturing) conditions are as shown in Table 2.

(Properties of Sample of Porous Carbon Structure No. 22 as Comparative Sample)

The characteristics of the sample of Porous carbon structure No. 22 produced by the above-mentioned steps were examined in the same manner as the measurements of the properties of each sample of Porous carbon structure Nos. 1 to 10, and the results are shown in Table 3.

Specifically, as for Porous carbon structure No. 22, the sample had a thickness of 354 μm as shown in Table 2, a basis weight of 12.6 mg/cm$^2$, a BET specific surface area of 1,434 m$^2$/g as shown in Table 3, a t-plot external specific surface area of 291 m$^2$/g as shown in Table 3, and a total t-plot external specific surface area ratio (SA ratio) of 20% as shown in Table 3. Also, the sample had a porosity of 81% as shown in Table 3.

As for Porous carbon structure No. 22, the sample had a thickness of 354 μm as shown in Table 2, a basis weight of 12.6 mg/cm$^2$, a BET specific surface area of 1,434 m$^2$/g as shown in Table 3, a t-plot external specific surface area of 1,142 m$^2$/g as shown in Table 3, and a total t-plot external specific surface area ratio (SA ratio) of 20% as shown in Table 3. Also, the sample had a porosity of 81% as shown in Table 3.

As shown in Table 3, it has been confirmed that the sample of Porous carbon structure No. 22 satisfies not all of the above-mentioned conditions (a) to (d).

(Preparation of Sample of Porous Carbon Structure No. 23 as Comparative Sample)

As for the sample of Porous carbon structure No. 23, as a composition (mixture composition) of a mixture slurry prepared therein, 90 wt % of Ketjen Black (registered trademark) and 10 wt % of PTFE (manufactured by DAIKIN INDUSTRIES, LTD.) as a binder were used, and the solution of the mixture slurry was prepared by dispersing the above components in ethanol to prepare a mixture slurry.

The mixture slurry was molded into a sheet having a uniform thickness by means of a wet film forming method using a doctor blade.

Next, the volatile solvent was removed from the produced sheet and the sheet was dried, and as a result, the film-like product was cracked and did not form a self-supporting film.

The specific producing (manufacturing) conditions are as shown in Table 2.

(Properties of Sample of Porous Carbon Structure No. 23 as Comparative Sample)

As for the sample of Porous carbon structure No. 23, since a self-supporting film was not obtained as described above, it was impossible to examine the characteristics of the sample as shown in Table 3.

(Preparation of Sample of Porous Carbon Structure No. 24 as Comparative Sample)

The sample of Porous carbon structure No. 24 was produced in the same manner as the preparation of Porous carbon structure No. 23 except that a molded sheet was produced by pressing at 10 MPa when forming the sheet from a mixture slurry. The dried film-like product was cracked and did not form a self-supporting film.

The specific producing (manufacturing) conditions are as shown in Table 2.

(Properties of Sample of Porous Carbon Structure No. 24 as Comparative Sample)

As for the sample of Porous carbon structure No. 24, since a self-supporting film was not obtained as described above, it was impossible to examine the characteristics of the sample as shown in Table 3.

(Preparation of Sample of Porous Carbon Structure No. 25 as Comparative Sample)

The sample of Porous carbon structure No. 25 was produced in the same manner as the preparation of Porous carbon structure No. 23 except that a mixture slurry prepared had a composition (mixture composition) of 95 wt % of Ketjen Black (registered trademark) and 5 wt % of PTFE (manufactured by DAIKIN INDUSTRIES, LTD.) as a binder. The dried film-like product was cracked and did not form a self-supporting film.

The specific producing (manufacturing) conditions are as shown in Table 2.

(Properties of Sample of Porous Carbon Structure No. 25 as Comparative Sample)

As for the sample of Porous carbon structure No. 25, since a self-supporting film was not obtained as described above, it was impossible to examine the characteristics of the sample as shown in Table 3.

Example 2B: Coin Cell (Lithium-Air Battery)

In Example 2B, a CR2032 type coin cell 601 (FIG. 6) was produced using each sample of Porous carbon structure Nos. 11 to 16 of the present invention manufactured (produced) in Example 1B as a positive electrode structure 690 (FIG. 6), and battery characteristics of the coin cell were evaluated. For comparison, a CR2032 type coin cell 601 was similarly produced using each comparative sample of Porous carbon structure Nos. 17 to 22 as a positive electrode structure 690 (FIG. 6), and battery characteristics of the coin cell were evaluated.

When the sample of Porous carbon structure No. 13 of the present invention was used as the positive electrode structure 690, grooves for the air flow were formed in the surface of the porous carbon structure. Specifically, as described above, a porous carbon structure was produced using ethanol as a poor solvent in the non-solvent induced phase separation method, and then grooves having a grid pattern were formed in the surface of the porous carbon structure in a wet state to form an air flow path required of an air battery in the surface of the porous carbon structure. The groove as a flow path had a width of about 2 mm and a depth of about 0.05 mm.

Comparative samples of Porous carbon structure Nos. 23 to 25 were not subjected to battery evaluation. This is because these samples did not form a self-supporting film as described above, and were not in a state of being capable of battery evaluation as a positive electrode.

A coin cell was manufactured as follows, similarly to the manufacture of the coin cell in Example 2A. In a dry room (in dry air) having a dew point temperature of −50° C. or less, a positive electrode structure obtained by cutting each of Porous carbon structure Nos. 11 to 16 into a piece having a diameter (Φ) of 16 mm, metal lithium (which has a diameter (Φ) of 16 mm and a thickness of 0.2 mm) as a negative electrode structure, and glass fiber paper (Whatman (registered trademark), GF/A) as a separator, which was immersed in a 1 M-tetraethylene glycol dimethyl ether solution of LiTFS (lithium trifluoromethanesulfonate) as an electrolytic solution, were mounted in a coin cell case (CR2032 type). In this way, an air battery (lithium-air battery) was produced.

As for the evaluation conditions in the discharge capacity test of the produced lithium-air battery, the test was performed at a discharge current density of 0.4 mA/cm$^2$ under a pure oxygen atmosphere, and the discharge capacity (mAh/g) per weight of the positive electrode was calculated by dividing the obtained discharge capacity by the weight of the porous carbon structure used as the positive electrode by taking the time point when the voltage decreased to 2.3 V as the discharge end point. The test results are shown in Table 4 together with the test results of each coin cell (lithium-air batterie) manufactured (produced) in Example 2A, each of which uses one of Porous carbon structure Nos. 1 to 8 and 10 of the present invention as a positive electrode.

Also, some of the lithium-air batteries manufactured (produced) in Example 2B were also tested, similarly to the coin cells (lithium-air batteries) manufactured (produced) in Example 2A, at higher speed discharge current densities of 0.6 mA/cm$^2$ and 0.8 mA/cm$^2$ in addition to a discharge current density of 0.4 mA/cm$^2$.

According to the results in Tables 2 and 4, it has been confirmed that similarly to the coin cells (lithium-air batteries) of Example 2A, all the samples of Porous carbon structure Nos. 11 to 16 of the present invention, which satisfy all of the above-mentioned conditions (a) to (d), can be used as a self-supportable positive electrode structure in an air battery, unlike the comparative samples (comparative examples) of Porous carbon structure Nos. 23 to 25 which satisfy not all of the conditions, and that the porous carbon structures can alone serve as a positive electrode material for an air battery without using a current collector such as a metal mesh. It has also been found that the samples as a whole exhibit much higher discharge capacity value than in the case where the comparative samples (comparative examples) of Porous carbon structure Nos. 17 to 22 which satisfy not all of the above-mentioned conditions (a) to (d) are used as the positive electrode structure.

As a result, it has been confirmed that according to the air batteries using the samples of Porous carbon structure Nos. 11 to 16 of the present invention as the positive electrode structure, air is sufficiently supplied to the positive electrode structure 690, and thus the air batteries become to have a sufficient output capacity and to be light in weight.

When the comparative sample of Porous carbon structure No. 22 having an activated carbon fiber woven fabric or the like as a support, which does not have a self-supporting ability, is used as the positive electrode structure, the discharge capacity at a discharge current density of 0.4 mA/cm$^2$ in Table 4 is much smaller than those when the samples of self-supportable Porous carbon structure Nos. 11 to 16 of the present invention are used. This result indicates the usefulness of the self-supportable porous carbon structure of the present invention.

In addition, it has been confirmed that when a porous carbon structure (specifically, Porous carbon structure No. 19 or 20), which was produced from a mixture slurry having a low percentage of Ketjen Black of the porous carbon particles as an active material and satisfies not all of the above-mentioned conditions (a) to (d), is used as the positive electrode structure, the air battery has low discharge capacity.

From the above, it has been shown that the porous carbon structure of the present invention which satisfies all of the above-mentioned conditions (a) to (d) does not require a current collector such as a metal mesh and alone serves as a positive electrode material for an air battery. It has also been shown that the air battery using the above porous carbon structure has high battery capacity and high-load characteristics which are generated by high air or oxygen diffusivity, high ion transport efficiency, and a wide reaction field, caused by the porous carbon structure.

INDUSTRIAL APPLICABILITY

As described above, the porous carbon structure of the present invention is a porous carbon structure having an unprecedented high pore volume. Use of the porous carbon structure as a positive electrode of an air battery can provide an air battery having high battery capacity and high-load characteristics which are generated by high air or oxygen diffusivity, high ion transport efficiency, and a wide reaction field, caused by the porous carbon structure. Furthermore, since the porous carbon structure has self-supporting ability with which the porous carbon structure can be used alone as a positive electrode material without using a current collector such as a metal mesh, it is possible to provide an air battery which is small in size and light in weight as well as which is suitable for increasing the capacity. Therefore, the present invention is expected to be preferably used in an air battery whose demand is expected to greatly expand in the future.

REFERENCE SIGNS LIST

10 Image of skeleton of porous carbon structure of the present invention
11 Image of pores having diameter of 1 nm or more and 1,000 nm or less of porous carbon structure of the present invention
12 Image of pores having diameter of 200 nm or more and 10,000 nm or less of porous carbon structure of the present invention
13 Image of carbon fibers of porous carbon structure of the present invention
100, 610 Negative electrode structure
500 Air battery
510, 620, 621 Positive electrode structure
520 Negative electrode current collector electrode
525 Positive electrode current collector electrode
540, 660 Separator
600, 601 Coin cell
630 Coin cell type restraint tool
635 Current collector
640 Metal layer
650 Spacer
670 Space (space for filling electrolyte)
680 Metal mesh
690 Porous carbon structure

The invention claimed is:

1. A porous carbon structure for an air battery positive electrode, the porous carbon structure comprising pores and a skeleton containing carbon, and satisfying all of conditions (a) to (e) shown as follows:
    (a) a t-plot external specific surface area is in a range of 900 m$^2$/g or more and 1,600 m$^2$/g or less;
    (b) a pore volume of the pores having a diameter of 1 nm or more and 200 nm or less is in a range of 2.2 cm$^3$/g or more and 7.0 cm$^3$/g or less;
    (c) a pore volume of the pores having a diameter of 1 nm or more and 1,000 nm or less is in a range of 4.0 cm$^3$/g or more and 10.0 cm$^3$/g or less;
    (d) an overall porosity is in a range of 92% or more and 99% or less; and
    (e) a pore volume of the pores having a diameter of 200 nm or more and 10,000 nm or less is in a range of 2.3 cm$^3$/g or more and 8.0 cm$^3$/g or less.

2. The porous carbon structure according to claim 1, wherein the pore volume of the pores having a diameter of 1 nm or more and 200 nm or less in (b) is in a range of more than 2.4 cm$^3$/g or more and 6.0 cm$^3$/g or less.

3. The porous carbon structure according to claim 1, wherein the pore volume of the pores having a diameter of 1 nm or more and 1,000 nm or less in (c) is in a range of 4.1 cm$^3$/g or more and 9.0 cm$^3$/g or less.

4. The porous carbon structure according to claim 1, the porous carbon structure having an apparent density in a range of 0.05 g/cm$^3$ or more and 0.20 g/cm$^3$ or less.

5. The porous carbon structure according to claim 1, wherein the skeleton is made of carbon.

6. A method for manufacturing the porous carbon structure according to claim 1, the method comprising the steps of:
    preparing a mixture slurry containing porous carbon particles and a binding polymer material;
    molding the mixture slurry;
    immersing a sample obtained by the molding step in a solvent in which the binding polymer material has low solubility;
    drying the sample obtained by the immersing step; and
    subjecting the sample obtained by the drying step to a carbonization treatment wherein the carbonization treatment is performed in an atmosphere of an oxidizing gas.

7. The method according to claim 6, wherein the oxidizing gas has an oxygen concentration in a range of more than 0.03% and less than 5%.

8. The method according to claim 6, wherein the carbonization treatment is performed at a treatment temperature in a range of 350° C. or more and 3000° C. or less.

9. The method according to claim 6, wherein the carbonization treatment is performed until a pore volume of the pores having a diameter of 1 nm or more and 1,000 nm or less in a product obtained by the carbonization treatment reaches 1.02 times or more a pore volume of a pore volume in the porous carbon particles.

10. The method according to claim 6, wherein the mixture slurry further contains carbon fibers.

11. The method according to claim 6, further comprising subjecting the sample obtained by the drying step to an infusibilizing treatment subsequent to the drying step and prior to the carbonization treatment.

12. The method according to claim 6, further comprising subjecting the sample obtained by the carbonization treatment to an additional carbonization treatment under an inert gas atmosphere subsequent to the carbonization treatment.

13. A positive electrode material for an air battery, the positive electrode material comprising the porous carbon structure according to claim 1.

14. An air battery comprising a positive electrode structure, a negative electrode structure, a separator, and an electrolyte member, wherein the positive electrode structure comprises the porous carbon structure according to claim 1.

15. The air battery according to claim 14, wherein the porous carbon structure has a flow path through which air or oxygen passes.

16. The air battery according to claim 14, wherein the positive electrode structure comprises a metal-containing positive electrode substrate having a flow path through which air or oxygen passes, and wherein the metal-containing positive electrode substrate is in electrical contact with the porous carbon structure.

17. The porous carbon structure according to claim 1, wherein the t-plot external specific surface area is in a range of 1036 m$^2$/g or more and 1,600 m$^2$/g or less.

* * * * *